(12) United States Patent
Wynn

(10) Patent No.: US 7,058,023 B2
(45) Date of Patent: Jun. 6, 2006

(54) SELF-CONFIGURING NETWORK TELEPHONE SYSTEM AND METHOD

(76) Inventor: Sol H. Wynn, 11046 Grenache Way, Elk Grove, CA (US) 95624

( * ) Notice: Subject to any disclaimer, the term of this patent is extended or adjusted under 35 U.S.C. 154(b) by 264 days.

(21) Appl. No.: 10/242,291

(22) Filed: Sep. 11, 2002

(65) Prior Publication Data
US 2004/0047297 A1    Mar. 11, 2004

(51) Int. Cl.
H04L 12/28 (2006.01)
H04M 3/42 (2006.01)
(52) U.S. Cl. .................. 370/254; 370/431; 379/201.12
(58) Field of Classification Search ................ 370/389, 370/400–401, 422, 260, 254, 431; 379/201.01, 379/201.12; 455/413
See application file for complete search history.

(56) References Cited

U.S. PATENT DOCUMENTS

| | | | |
|---|---|---|---|
| 4,837,799 A * | 6/1989 | Prohs et al. ................. 379/224 |
| 4,914,689 A * | 4/1990 | Quade et al. .......... 379/142.01 |
| 5,625,675 A * | 4/1997 | Katsumaru et al. ....... 379/88.25 |
| 5,781,552 A * | 7/1998 | Hashimoto .................. 370/447 |
| 5,883,944 A * | 3/1999 | Burke et al. ................ 379/159 |
| 5,892,764 A | 4/1999 | Riemann et al. |
| 5,903,724 A * | 5/1999 | Takamoto et al. .......... 709/200 |
| 5,943,319 A | 8/1999 | Fraser |
| 5,953,322 A * | 9/1999 | Kimball ...................... 370/328 |
| 5,978,568 A | 11/1999 | Abraham et al. |
| 6,069,888 A * | 5/2000 | LaRocca ..................... 370/342 |
| 6,118,862 A | 9/2000 | Dorfman et al. |
| 6,130,893 A | 10/2000 | Whittaker et al. |
| 6,144,724 A | 11/2000 | Stovall |
| 6,181,736 B1 | 1/2001 | McLaughlin et al. ........ 375/222 |
| 6,243,379 B1 | 6/2001 | Veerina et al. |
| 6,421,425 B1 | 7/2002 | Bossi et al. ................... 379/52 |
| 6,449,269 B1 | 9/2002 | Edholm |
| 6,456,625 B1 | 9/2002 | Itoi |
| 6,487,200 B1 | 11/2002 | Fraser |
| 6,498,791 B1 | 12/2002 | Pickett et al. |
| 6,510,454 B1 | 1/2003 | Walukiewicz |
| 2002/0006137 A1 | 1/2002 | Rabenko et al. |
| 2002/0039407 A1* | 4/2002 | O'Donovan et al. ....... 379/67.1 |
| 2002/0103872 A1* | 8/2002 | Watanabe .................... 709/206 |

(Continued)

OTHER PUBLICATIONS

"PCT International Search Report", Application Number PCT/US03/27676, mailed Mar. 1, 2004.

*Primary Examiner*—Chi Pham
*Assistant Examiner*—Kevin C. Harper
(74) *Attorney, Agent, or Firm*—Kang Lim

(57) ABSTRACT

A self-configuring telephone device interconnected by a network to other network telephone devices. The network telephone device is especially adapted to connect to other similar devices on a network, such as a local area network, without the need for a central controller or secondary wiring. A network telephone sends a broadcast over the network with a predetermined number. If there is no other telephone on the network, the network telephone assigns the predetermined number to itself and notifies the network. If there is another telephone on the network, the phone receives a message so indicating and a directory of numbers from which to choose a non-conflicting telephone number. When a non-conflicting number is found, the telephone adopts the number and informs the network. Voice mail and calls between outside lines and a network phone are supported as well.

26 Claims, 29 Drawing Sheets

U.S. PATENT DOCUMENTS

| | | |
|---|---|---|
| 2003/0123636 A1* | 7/2003 | Bigelow ................ 379/220.01 |
| 2003/0179743 A1 | 9/2003 | Bosik et al. ................ 370/352 |
| 2003/0194071 A1* | 10/2003 | Ramian ................ 379/114.19 |
| 2003/0214930 A1 | 11/2003 | Fischer |
| 2003/0227910 A1 | 12/2003 | Koyama |
| 2004/0029568 A1* | 2/2004 | DeLuca et al. .......... 455/412.1 |

* cited by examiner

SELF-CONFIGURING NETWORK TELEPHONE SYSTEM AND METHOD

BACKGROUND OF THE INVENTION

1. Field of the Invention

The present invention pertains to a local area network-coupled telephone system and method. More particularly, the present invention describes a self-configuring local area network phone system for use in Ethernet networks.

2. Description of the Related Art

The use of local area networks (LAN) to support telephone systems has become increasingly popular as the speed available on the LAN have increased. It is not uncommon to find current Ethernet based networks capable of data rates from 100 Mbits/sec to 1000 Mbits/sec (1 Gbit/sec). This has made it more practical to integrate digitized voice traffic onto these networks without impacting the main data traffic also flowing on the network. In many companies and organizations, most users have computer systems connected into a LAN system. Traditionally, these users have a telephone line connected to their office as well. The costs associated with maintaining both LAN and telephone wiring systems can be reduced if either the LAN system or the telephone wiring system is eliminated. Because the networking requirements of most office computers cannot be met by traditional phone networks, this means that the telephone wiring system should be eliminated and the telephone system should operate over the LAN. Benefits of this arrangement include the use of the existing LAN wiring, easy expandability for new users, potentially increased functionality, and reduced cost.

One system in which a telephone system operates over a LAN includes a Personal Computer (PC) connected to the LAN and having an interface module for connecting to an analog telephone. A disadvantage of such a system is that the user must have a PC on and operating to use his phone. Additionally, connecting multiple phones to the LAN requires a hub device. The disadvantage of the required hub device is that a secondary wiring system connecting each analog phone to the hub must be supplied, in addition to the LAN. This reduces the cost effectiveness of LAN-based communication.

Another system that is available uses telephone units connected directly to the LAN via Ethernet connections, but requires a central controller, also connected to the LAN, to manage all call traffic. The central controller, which has an interface to the Public Switched Telephone Network (PSTN), supports only a limited number of call stations. Multiple controllers can be interconnected to increase the capacity of the system, but at increased cost.

For the smaller office, the above systems are still too complex and expensive. Many small office organizations cannot afford the dedicated Information Technology (IT) support necessary to set up and operate these systems. Even larger organizations can benefit from a system of reduced complexity that benefits from greatly reduced startup and configuration time periods. Therefore, there is a need for a LAN-based phone system that is lower in overall cost, is faster to setup and configure, and requires less IT support, than the above-described systems.

BRIEF SUMMARY OF THE INVENTION

A method in accordance with the present invention includes a method for automatically configuring a network phone system. The method includes broadcasting, by a phone connected to the network, a command containing a predetermined telephone number over the network and if a network response is received during a timeout period, determining from the response that the predetermined telephone number is already assigned to another telephone connected to the network. A directory message is received over the network after receiving the number-assigned response, where the directory message includes a telephone directory containing numbers assigned to telephones connected to the network and a non-conflicting telephone number is found from the received telephone directory. The found number is adopted as the number for the phone, and the adopted number is broadcast over the network.

In one embodiment, the step of broadcasting a command containing a predetermined telephone number is performed by sending out a broadcast frame with a 'Phone Number Tryout Command', the network response received during the timeout period is a 'Number Exists Command', the directory message is a 'Directory Transmit Command', and broadcasting the adopted number over the network is performed by sending out a broadcast frame with a 'Phone Number Broadcast Command'.

The step of finding a non-conflicting telephone number includes selecting the next available number from the telephone directory, broadcasting, over the network, a command containing the selected number, and if no response to the broadcast occurs within a timeout period, adopting the selected number as the number for the phone.

One advantage of the present invention is that only the network telephone devices and a network are required to establish a telephone system. Usually, the network is an existing network, so that only the network telephones need to be supplied, thereby keeping the cost of the system low.

Another advantage is that the time to setup the network-based phone system is shorter than a conventional system.

BRIEF DESCRIPTION OF THE DRAWINGS

These and other features, aspects and advantages of the present invention will become better understood with regard to the following description, appended claims, and accompanying drawings where:

DETAILED DESCRIPTION OF THE INVENTION

Figure 1:
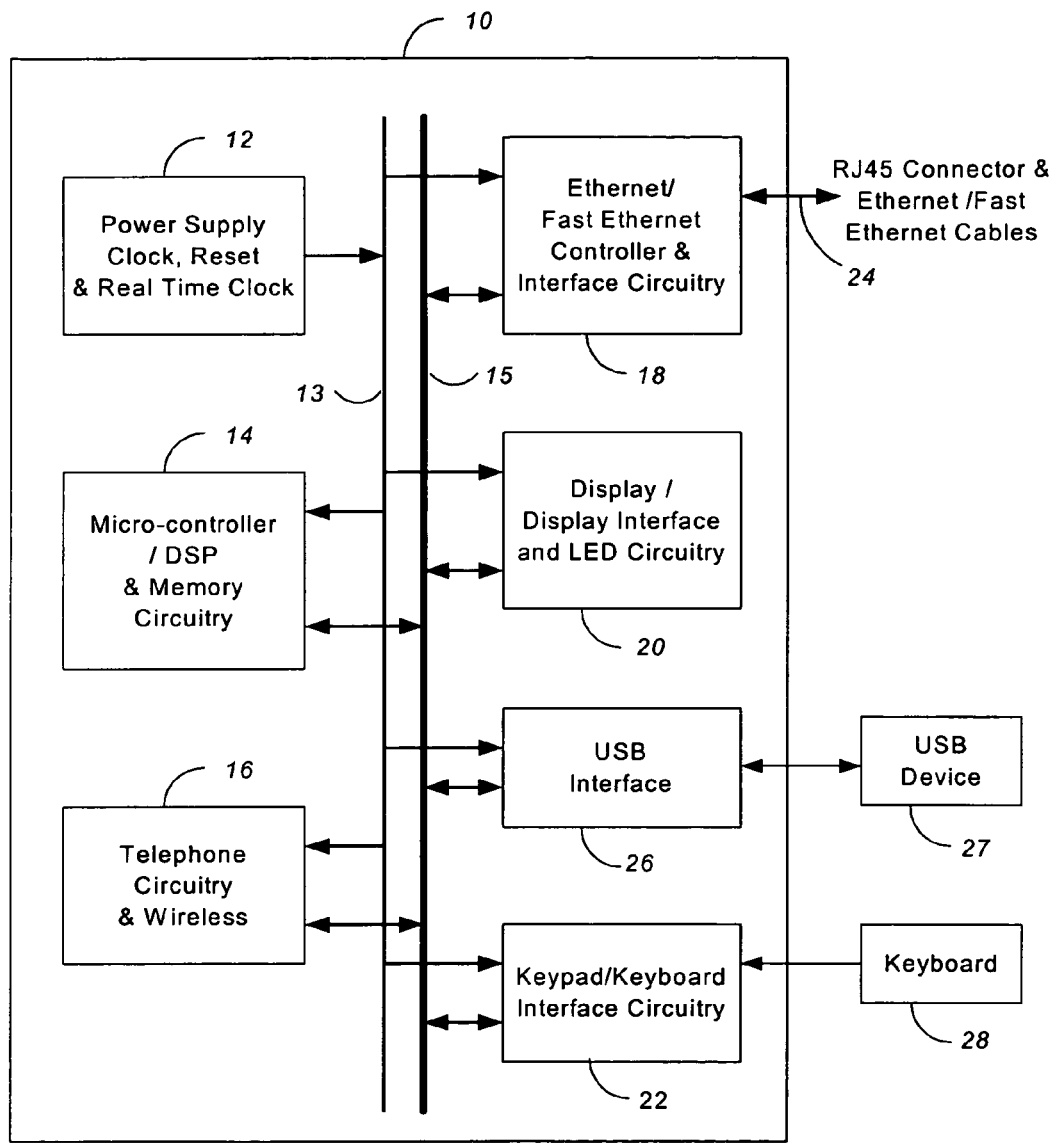
FIG. 1 shows a functional block diagram of a telephone device for connection to a LAN in accordance with an embodiment of the present invention.

FIG. 1 shows a functional block diagram of a Telephone Device 10 for connection to a LAN (Local Area Network), in accordance with an embodiment of the present invention. Network connection to the Telephone Device 10 is made through 10/100/1000 Megabit/sec Ethernet cables 24 of the LAN, although other network wiring technologies, such as high speed optical cable, may also be used. For Ethernet networks, RJ-45 type connectors are utilized to connect telephone device 10 to LAN cables 24, but other acceptable connectors are also utilized, as is well known to those skilled in the art. An Ethernet controller 18 interfaces the Micro-controller & Memory Circuitry 14 to the LAN via a standard data, address, and control bus 15. An example of such device is the ASIX AX88796 L Local Bus Fast Ethernet Controller (with ADSP-21065L) or the Intel LXT871A Fast Ethernet Transceiver (with PPC855T).

The Micro-controller & Memory Circuitry 14 is coupled to the Display Interface Circuitry 20, Key Pad Interface circuitry 22, Telephone Circuitry 16, and USB (Universal Serial Bus) Interface Circuitry 26. Power supply and clock functions in Power Supply Module 12 are supplied to Micro-controller & Memory Circuitry 14, Telephone Circuitry 16, Ethernet Circuitry 18, Display Circuitry 20, Keyboard Circuitry 22, and USB Interface Circuitry 26 via Power Bus 13. Micro-controller & Memory Circuitry 14 includes a CPU/DSP (Central Processing Unit/Digital Signal Processor) that fetches, decodes, and executes the program that resides in its internal or external memory. An example of such a device is the Analog Devices ADSP-21065L or Motorola PPC855T CPU. Memory configurations can include (but are not limited to) flash, EPROM (electronically programmable read only memory), EEPROM (electronically erasable programmable read only memory), RAM (random access memory), DRAM (dynamic random access memory), SRAM (static random access memory), and SDRAM (synchronous DRAM ). The primary functions of the Micro-controller & Memory Circuitry 14 are to control and communicate with Telephone Circuitry 16, Ethernet Circuitry 18, Display Circuitry 20, Key Pad Interface circuitry 22, and USB Interface Circuitry 26 within telephone device 10, as well as communicate with other network devices connected to the LAN. For example, this may include decoding keypad signals from Key Pad Interface circuitry 22, receiving, decoding, and transferring voice data (via voice recognition) and tone signals to and from Telephone Circuitry 16, receiving/transmitting USB data from USB Interface Circuitry 26, displaying incoming network data and keypad inputs, displaying help menus, and other functions on Display Circuitry 20. A separate keyboard 28 may also be attached via Key Pad Interface circuitry 22.

USB Interface Circuitry 26 is utilized to communicate with USB device 27 to enable data transfers to and from the LAN. An example of such a device is the USS-820D USB Device Controller from Agere Systems. Examples of USB device 27 include printers, digital cameras, scanners, video devices, memory devices, personal assistants, portable personal computers. For example, in one application, a video input/out device is connected so video and audio transmission can take place via the network phone. The USB port can be assigned with its own separate phone number, if desired. In another application, a document is transmitted to a destination elsewhere on the LAN by using a USB scanner as USB device 27. The document is received and printed at another network phone via a printer connected as device 27, or at a print server directly connected to the LAN.

Power Supply Circuitry 12 provides DC power for all modules, power on RESET functions, clock synchronization, and real time clock information including date. Power Supply Circuitry 12 may also include a battery backup system for power loss operation. Telephone Circuitry 16 provides the standard handset and speaker/microphone interface and analog to digital conversion.

Figure 2:
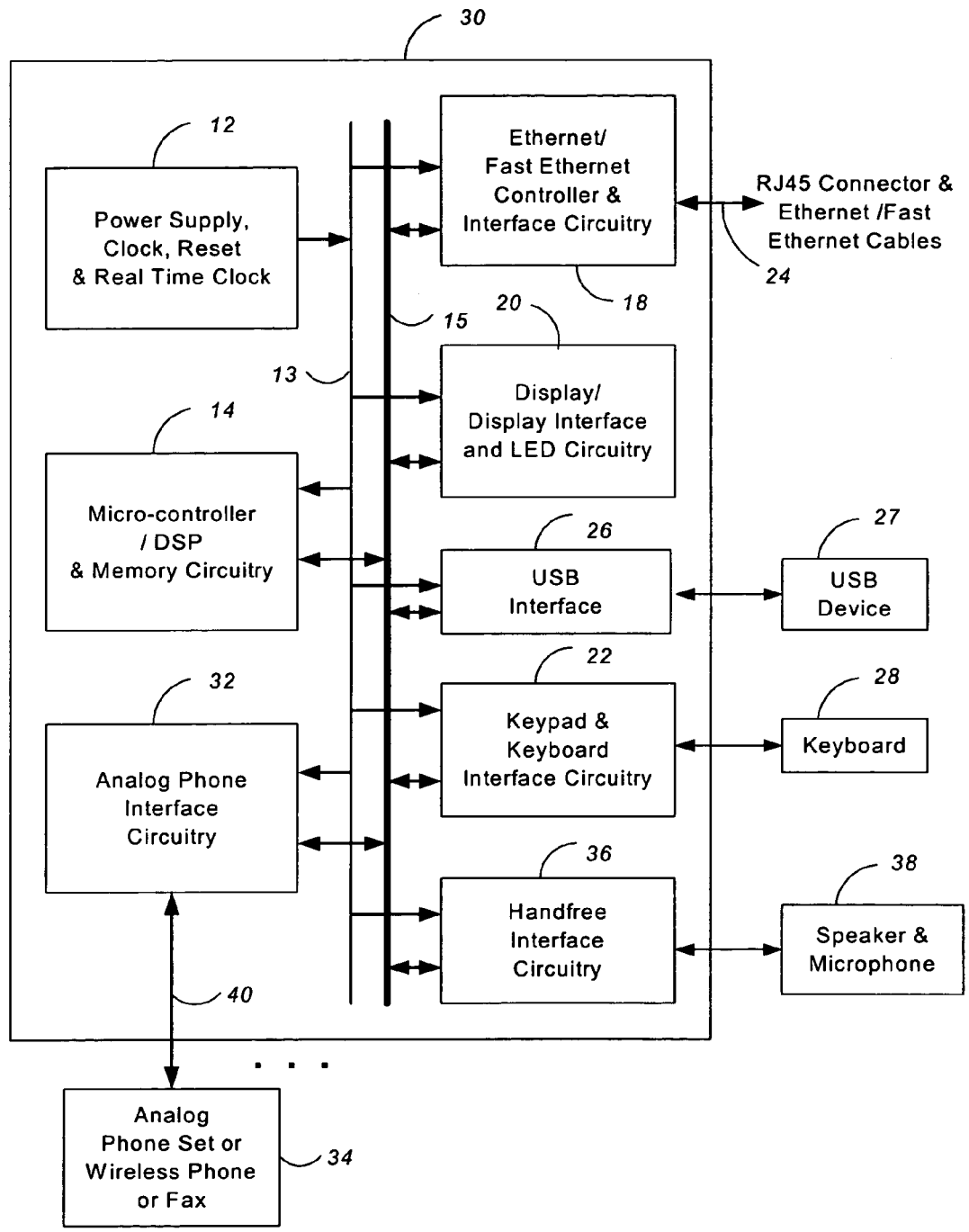
FIG. 2 shows a functional block diagram of a device for interfacing an analog telephone to a LAN in accordance with an embodiment of the present invention.

FIG. 2 shows a functional block diagram of a device 30 for interfacing an analog telephone set 34 to a LAN, in accordance with an embodiment of the present invention. Analog Phone LAN Interface device 30 contains components that allow interfacing of a standard analog telephone set 34 with a LAN system, preferably an Ethernet LAN system. Analog Phone Interface circuitry 32 decodes voice and key input DTMF (dual tone multi-frequency) commands for digital transmission over the LAN. Analog Phone Interface circuitry 32 also provides dial tone, busy tone and ring tone functions to an analog phone set 34. An example of Analog Phone Interface circuitry 32 is the Silicon Laboratories Si3210 (Programmable CMOS SLIC/Codec with Ringing/Battery Voltage Generation). The analog phone set 34 may be connected to device 30 via standard RJ11 connectors and phone wire 40. Analog phone set 34 may also include a fax machine or cordless telephone.

The analog phone LAN interface device 30 also contains Hands-Free Interface circuitry 36 for connection to speaker and microphone 38 to provide hands-free operation that is absent from many analog phone sets. A numerical keypad is optional for analog phone LAN interface device 30, because most analog phone sets 34 already contain a numeric keypad.

Figure 3:
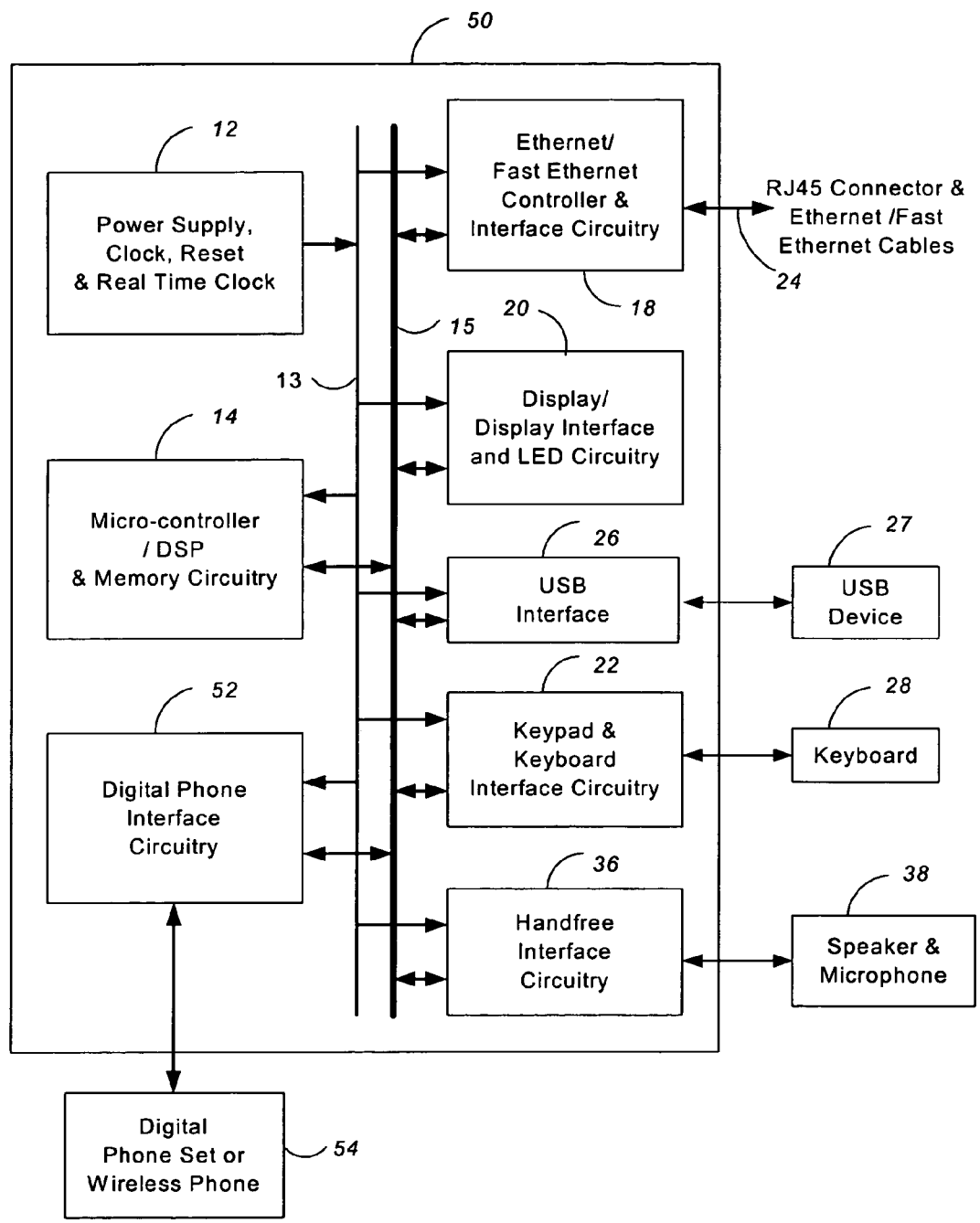
FIG. 3 shows a functional block diagram of a device for interfacing a digital telephone to a LAN in accordance with an embodiment of the present invention.

FIG. 3 shows a functional block diagram of a device 50 for interfacing a digital telephone 54 to a LAN, in accordance with an embodiment of the present invention. Since the communication protocols for digital phone sets are non-standard and specific to each manufacturer, custom Digital Phone Interface Circuitry 52 is utilized to decode voice and key input commands for the digital phone set 54. Hands-free Interface Circuitry 36 may not be needed, since this is often provided on digital phone set 54. Other functions of Digital Phone LAN Interface device 50 are similar to those described for Telephone Device 10 and Analog Phone LAN Interface device 30.

Figure 4A:
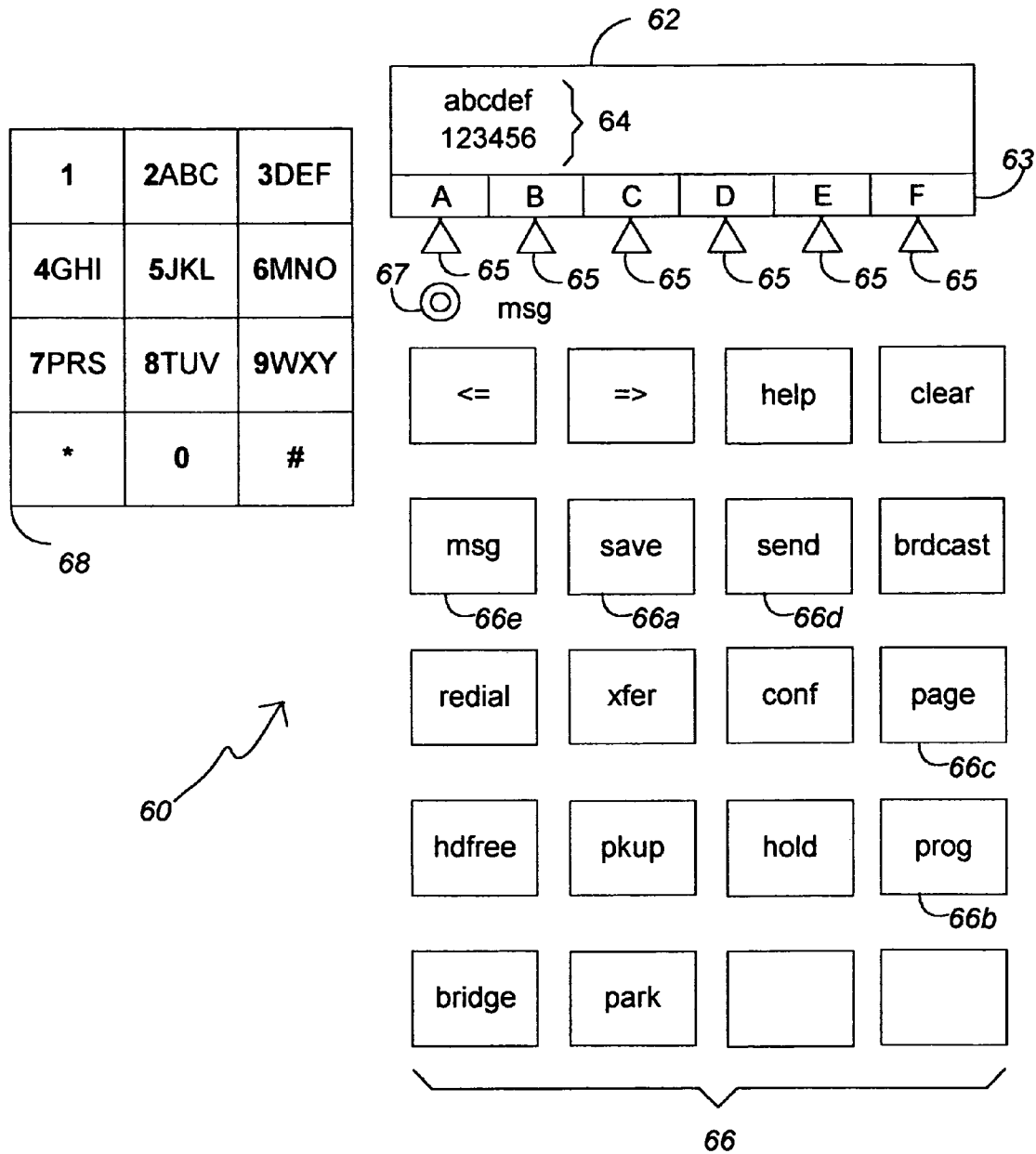
FIG. 4A shows a layout of the keypad and display of a network telephone device in accordance with an embodiment of the present invention.

FIG. 4A shows a layout 60 of the keypad and display 62 of a network telephone device in accordance with an embodiment of the present invention. The keypad includes keys 63, 66, and 68. A standard telephone numeric keypad 68 is used to input numeric and character information. Keys 66 are fixed function keys and keys 63 are programmable function keys A–F. Indicator lamps 65 are used to indicate which functions A–F are active. Not all keys are shown or need be used in any given phone configuration, such as Telephone Device 10, Analog Phone LAN Interface device 30, or Digital Phone LAN Interface device 50. A display 62 is also provided for viewing character-based information 64. The display may be liquid-crystal, plasma, light-emitting diodes or any other suitable technology. A message lamp 67 indicates the status of voicemail messages. Table 1 shows an example of control key values, in hexadecimal, for the keys shown in FIG. 4A.

Figure 4B:
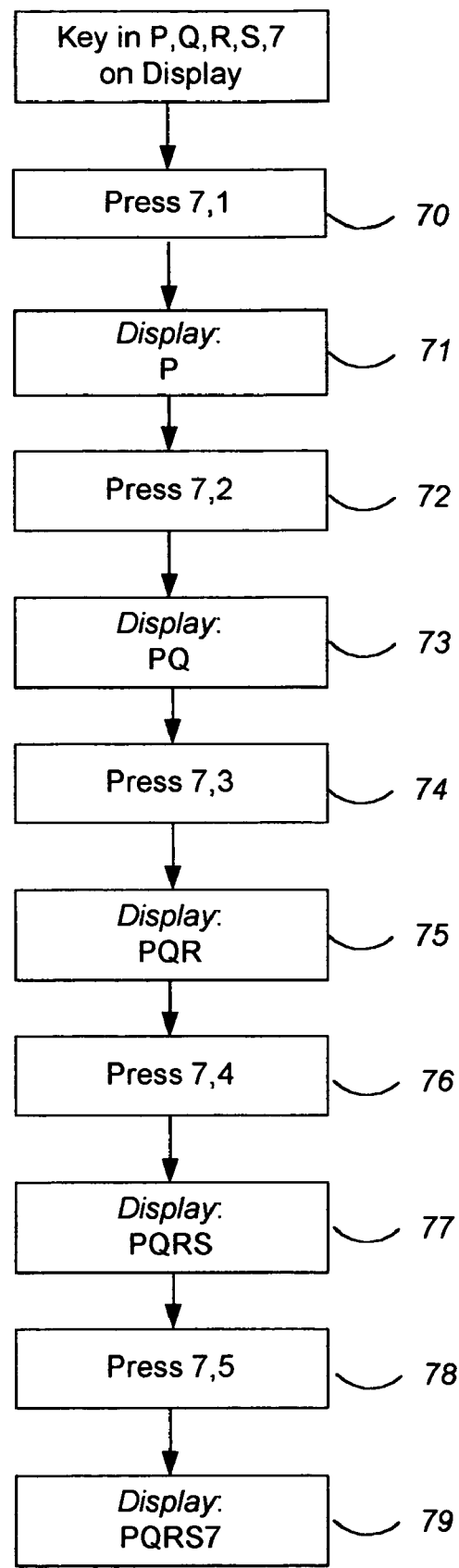
FIG. 4B shows a process block diagram for entering characters on the display of FIG. 4A in accordance with an embodiment of the present invention.

FIG. 4B shows a process block diagram for entering characters PQRS7 on the display 62 of FIG. 4A, in accordance with an embodiment of the present invention. Since each key in pad 68 contains multiple alpha and numeric characters, distinguishing between each is illustrated in this example. Starting at step 70 of FIG. 4B, the character P is entered on the display by pressing the '7' key (or 7PQRS key) followed by the '1' key, indicating the first character in the PQRS string on the 7 key. The display indicates P, in step 71. Q is added to the display, in step 72, by pressing the '7' key followed by the '2' key, giving PQ on the display, as indicated in step 73. Pressing the '7' and '3' keys, in step 74, yields PQR on the display, in step 75. Pressing the '7' and '4' keys, in step 76, yields PQRS on the display, in step 77. Pressing the '7' and '5' keys, in step 78, yields PQRS7 on the display, in step 79. For the purposes of future discussion, when a character is entered into the display, it is assumed that a process similar to that described in FIG. 4B is utilized, even though a shortened description such as "type in ABC" may be recited.

TABLE 1

| Numeric Key Description 68 | Control Key Value, Hex | Function Key Description 66 | Control Key Value, Hex | Variable Key Description 63 | Control Key Value, Hex |
|---|---|---|---|---|---|
| 1 | 01 | > | 10 | A | 30 |
| 2 | 02 | < | 11 | B | 31 |
| 3 | 03 | help | 12 | C | 32 |
| 4 | 04 | clear | 13 | D | 33 |
| 5 | 05 | msg (ref 66e) | 14 | E | 34 |
| 6 | 06 | save (ref 66a) | 15 | F | 35 |
| 7 | 07 | send (ref 66d) | 16 | | |
| 8 | 08 | brdcast | 17 | | |
| 9 | 09 | redial | 18 | | |

TABLE 1-continued

| Numeric Key Description 68 | Control Key Value, Hex | Function Key Description 66 | Control Key Value, Hex | Variable Key Description 63 | Control Key Value, Hex |
|---|---|---|---|---|---|
| 0 | 0A | xfer | 19 | | |
| * | 0B | conf | 1A | | |
| # | 0C | page (ref 66c) | 1B | | |
| spare | 00 | hdfree | 1C | | |
| | | pkup | 1D | | |
| | | hold | 1E | | |
| | | prog (ref 66b) | 1F | | |
| | | bridge | 20 | | |
| | | park | 21 | | |

Figure 5:
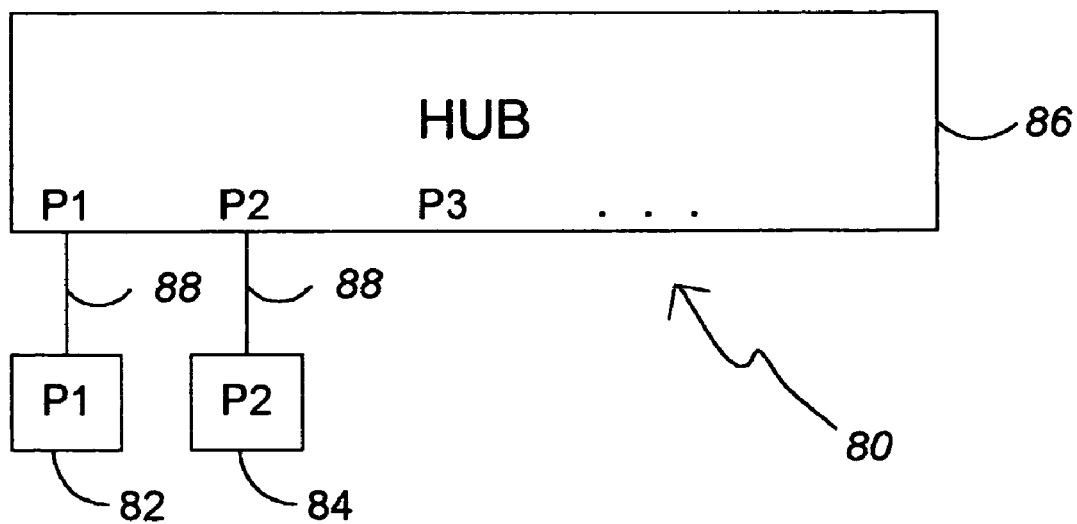
FIG. 5 shows a block diagram illustrating a pair of network telephones coupled to a LAN hub in accordance with an embodiment of the present invention.

FIG. 5 shows a block diagram 80 illustrating a pair of network telephones 82, 84 coupled to a LAN hub 86, in accordance with an embodiment of the present invention. Preferably, LAN hub 86 is an Ethernet hub, but may be other technologies as well. Subsequent discussion is limited to Ethernet systems by way of example, but this in no way limits the application only to Ethernet systems, since other alternate high-speed network systems are suitable as well. Network telephones 82, 84 are connected to LAN Ethernet lines 88 via 10/100/1000 Mbit/sec shielded or unshielded twisted pair cables, or other compatible high speed data cables. Cables 88 are connected to telephones 82 and 84 with, for example RJ-45 connectors, but other compatible connectors may also be utilized. Network telephones 82, 84 are coupled to LAN hub 86 for communication with other devices coupled to the LAN. The operation of telephones 82 and 84 does not require a central switch, control station, or PBX system to configure their operation or make calls to one another, or other telephones on the same LAN system.

Figure 6:
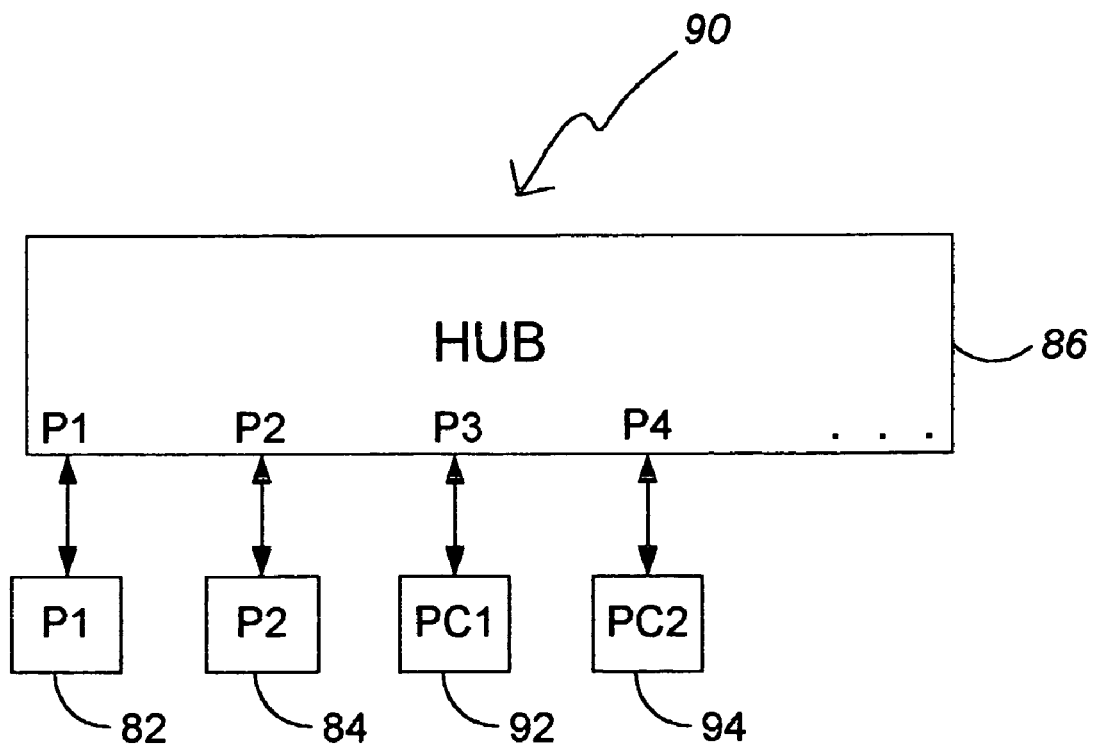
FIG. 6 shows a block diagram illustrating a pair of network telephones and a pair of personal computers coupled to a LAN hub in accordance with an embodiment of the present invention.

FIG. 6 shows a block diagram 90 illustrating a pair of network telephones P1 82, P2 84 and a pair of personal computers PC1 92, PC2 94 coupled to LAN hub 86, in accordance with an embodiment of the present invention. Network phones P1 and P2 can operate cooperatively with other devices, such as PC1 and PC2 coupled to hub 86. Network phones P1 and P2 may call each other or other phones (not shown) coupled to the LAN without interfering with the network communication of PC1 and PC2 (except for a small increase in network data traffic). P1 and P2 may also communicate directly with PC1 and PC2 for services such as Voice Mail, or to facilitate data communication between, for example, USB devices 27 connected to the network phones 82, 84 and the PCs. Once phones P1 and P2 are installed and configured, a first user on phone P1 can place a call to a second user on phone P2 without the need for a central switching device to route the call.

Figure 7A:
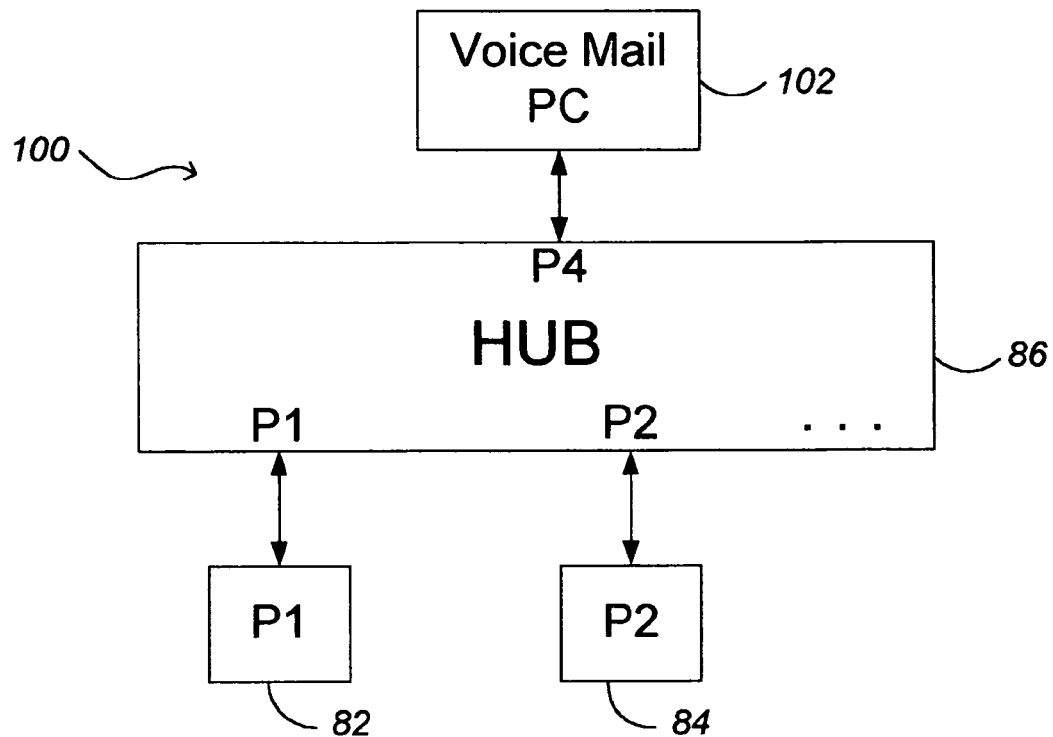
FIG. 7A shows a block diagram illustrating two network telephones and a voice mail equipped PC coupled to a LAN hub in accordance with an embodiment of the present invention.

FIG. 7A shows a block diagram 100 illustrating two network telephones 82, 84 and a voice mail-equipped PC 102 coupled to a LAN hub 86, in accordance with an embodiment of the present invention. P1 and P2, coupled to LAN hub 86, utilize communication through the LAN to leave voice mail or data messages in the storage provided by the PC 102. Use of the PC may be advantageous for this purpose due to the large amount of inexpensive memory available. It is also possible to provide messaging memory capability in each of phones P1 and P2, although at reduced capacity. If a reduced capacity is acceptable, some network communication advantages, such as reduced network traffic, may be obtained by locally storing voice mail messages in the phone units 82, 84. However, for larger systems with a greater number of users, the voice mail equipped-PC is more efficient and secure, because voice mail messages are backed-up routinely in such a system to prevent accidental loss. Also, PC usage provides hard drive memory storage at a much lower cost than solid state DRAM costs.

Figure 7B:
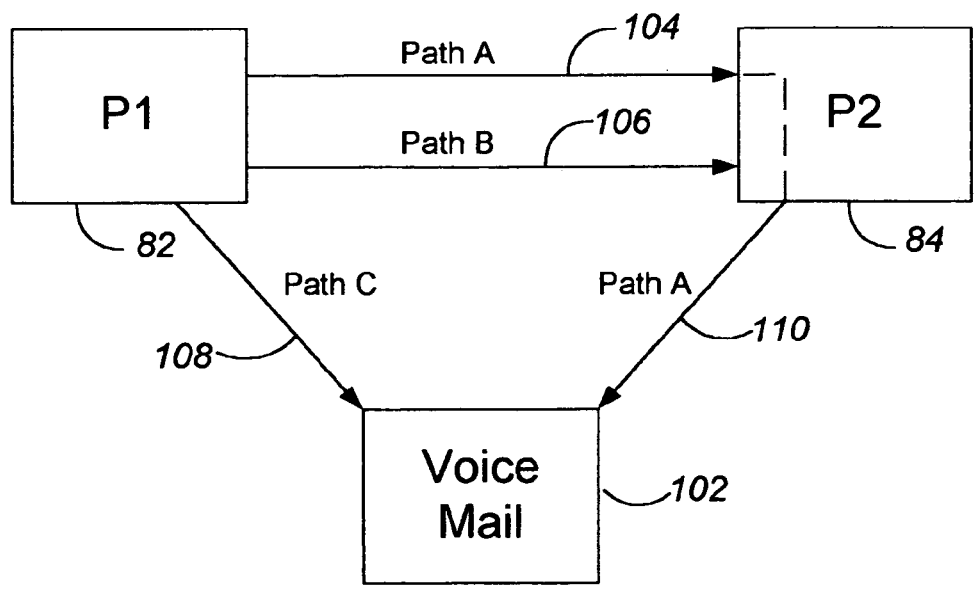
FIG. 7B shows a block diagram illustrating voice mail message pathways between two network phones and a voicemail PC in accordance with an embodiment of the present invention.

FIG. 7B shows a block diagram illustrating voice mail message pathways between two network phones P1 82, P2 84 and a voicemail PC 102, in accordance with an embodiment of the present invention. There are potentially three message pathways available if a user on network phone P1 wants to leave a voice message for a user on network phone P2. For systems without a voice mail-equipped PC, Path B 106 is the only route available, wherein a voice mail message is transmitted directly to P2 from P1 and stored there in local memory. For systems with a voice mail PC, Path A 104, 110 and Path C 108 are available. In Path A, the voice mail message is routed from phone P1 to phone P2, then to the voice mail PC 102. In Path C 108, the voice mail is routed from phone P1 82 directly to the voice mail PC 102. The detailed process for both paths A and C is explained in further detail below.

Figure 8:
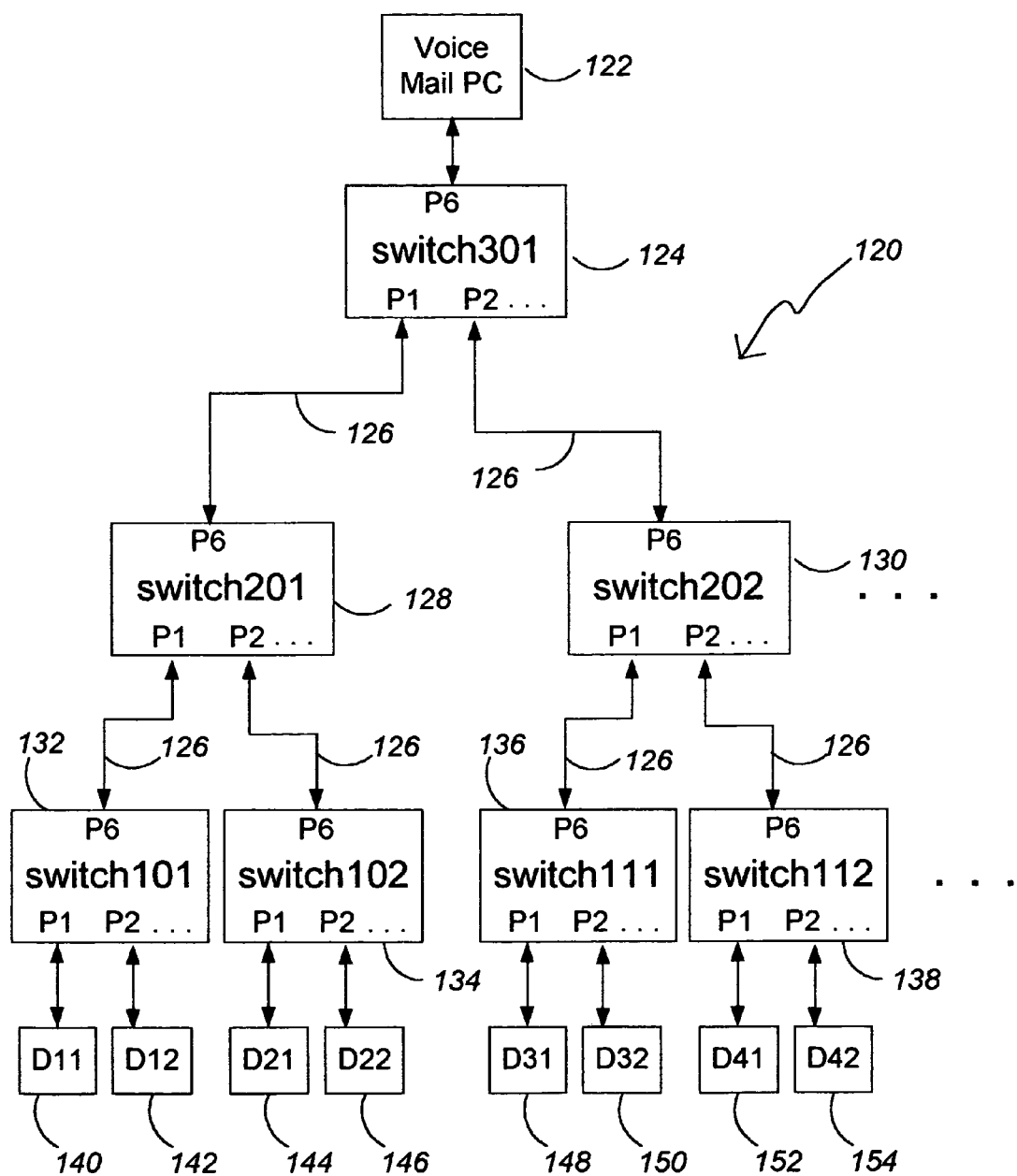
FIG. 8 shows a schematic block diagram illustrating connection of multiple network telephones to a voice mail PC via Ethernet LAN switches in accordance with an embodiment of the present invention.

FIG. 8 shows a schematic block diagram 120 illustrating connection of multiple network telephones to a voice mail PC via Ethernet LAN switches, in accordance with an embodiment of the present invention. In FIG. 8, three levels of interconnected LAN switches are utilized to connect a larger number of network phones to a voice mail PC 122, though any number of levels can be used. In this example, the switches 124, 128, 130, 132, 134, 136, 138 are six-port P1–P6 (not all shown) units. Six-port switches are illustrated, but switches of greater or lesser ports can be utilized as equivalent. Voice mail PC 122 is coupled to port P6 of switch301 124, which in turn may be connected to up to five switches at level 200, although only two of these, switch201 128 and switch202 130, are illustrated for clarity and simplicity. To the five ports of each of the switches 128, 130 at level 200, up to five additional switches at level 100 may be added. Only two are illustrated for clarity. In this example, switch101 132 and switch102 134 are coupled to ports on switch201 128. In like fashion, switch111 136 and switch 112 138 are coupled to switch202 130. Network devices 140-154 are coupled to the ports on each of the switches 132, 134, 136, 138 at level 0. All of these devices 140–154 may be network phones, or only a portion, with the remaining devices being PCs, servers, or other compatible devices. LAN hubs may be utilized instead of switches 124, 128, 130, 132, 134, 136, 138 or any combination of hubs and switches. For Ethernet based systems, interconnection lines 126 are preferably high-speed 10/100/1000 Mbits/sec base-T Ethernet cables.

Figure 9:
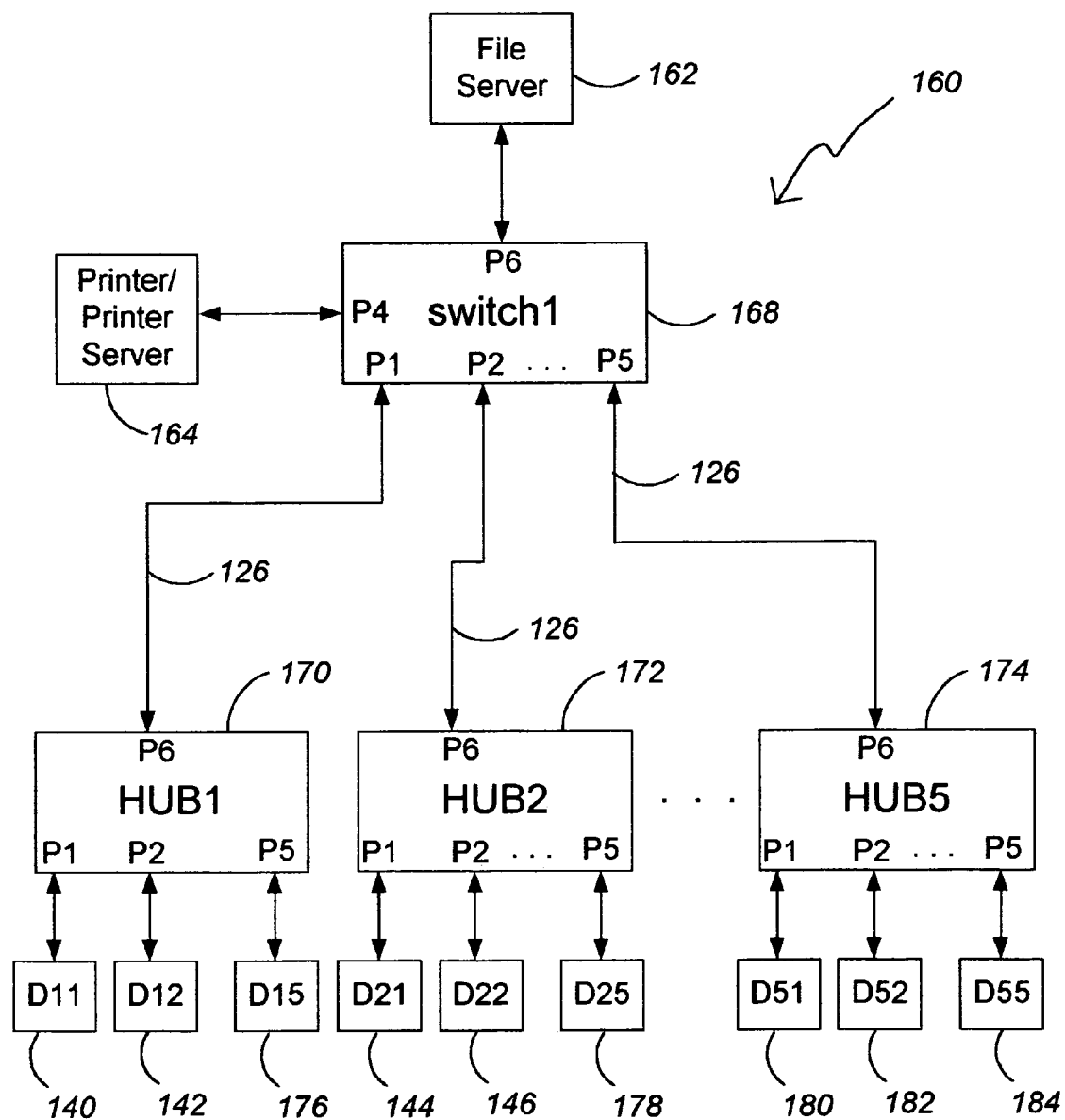
FIG. 9 shows a schematic block diagram illustrating connection of multiple network telephones to Ethernet LAN hubs and switches in accordance with an embodiment of the present invention.

FIG. 9 shows a schematic block diagram illustrating the connection of multiple network telephones to Ethernet LAN hubs and switches, in accordance with an embodiment of the present invention. A typical LAN system 160 includes a file server 162 coupled to an Ethernet switch 168. The switch may be subsequently coupled to LAN hubs 170–174 and print server 164. To each of the six-port hubs 170–174, up to five network devices D11 140, D12 142, D15 176, D21 144, D22 146, D25 178, D51 180, D52 182, D55 184 may be connected. For clarity only some are shown in the figure. Any number of the network devices 140, 142, 176, 144, 146, 178, 180, 182, 184 may be network phones, the balance being other suitable network devices such as PCs or servers. Six port switch 168 and hubs 170, 174 are illustrated, but a switch and hubs having more or fewer ports can be utilized as equivalent.

Figure 10:
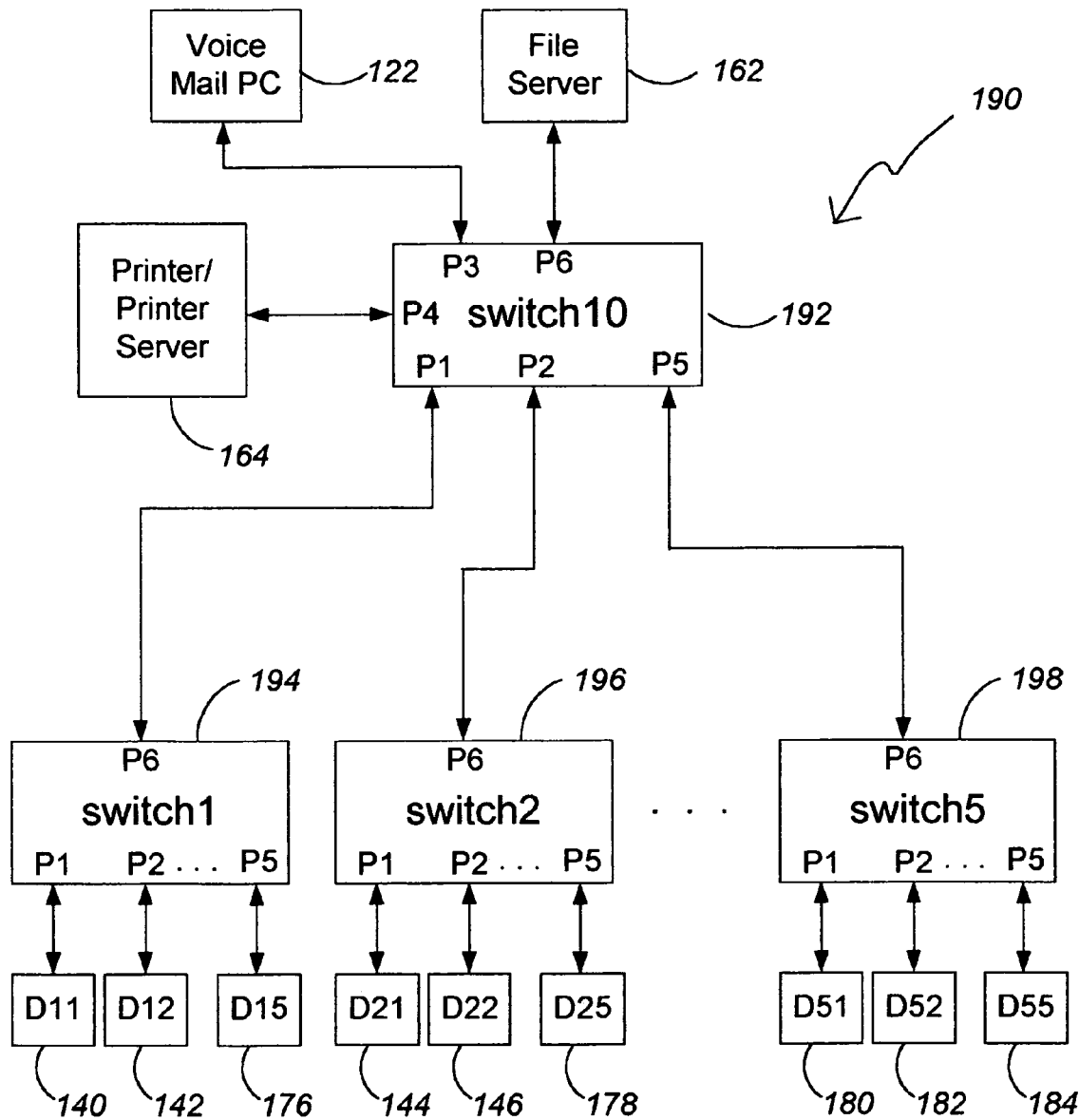
FIG. 10 shows a schematic block diagram illustrating multiple network telephones and voicemail connected to Ethernet LAN switches in accordance with an embodiment of the present invention.

FIG. 10 shows a schematic block diagram 190 illustrating multiple network telephones and voicemail connected to Ethernet LAN switches, in accordance with an embodiment of the present invention. Hubs 170, 172, 174, in FIG. 9, are replaced with Ethernet LAN switches 194, 196, 198. Network devices 140–146, 176–184 are coupled to switches 194–198. Any number of the network devices 140–146, 176–184 may be network phones. Switches 194–198 are in turn coupled to switch 192. File server 162 and printer server 164 are also coupled to switch 192. As previously noted, the file server 162 and print server 164 may be connected to any of switches 192–198 in the LAN system 190. Switches 194–198 are employed instead of hubs to reduce data collisions (multiple LAN devices transmitting at the same time) and improve network performance.

Figure 11:
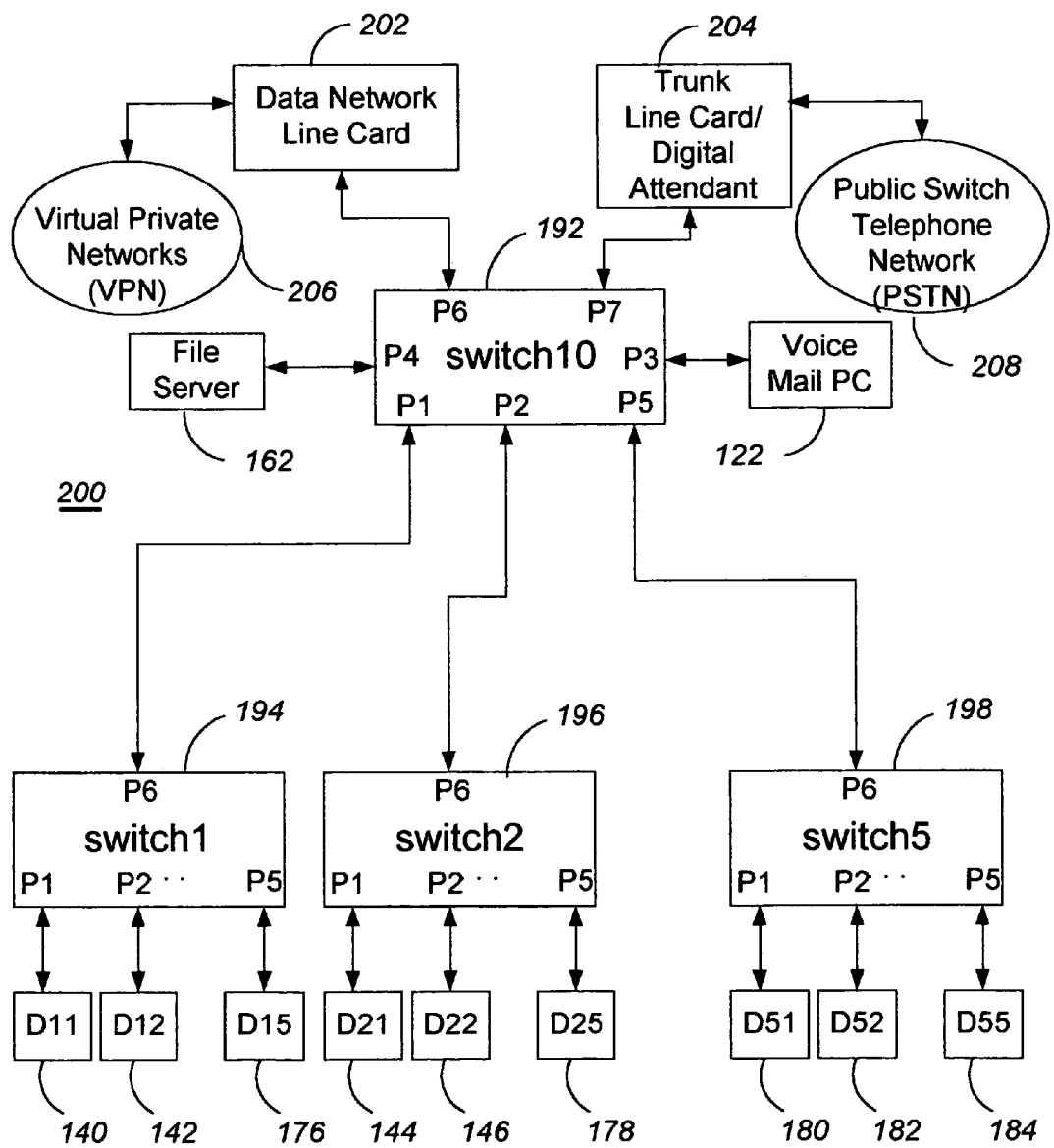
FIG. 11 shows a schematic block diagram illustrating the connection of External Networks and Public Switched Phone Networks to a LAN containing network telephones in accordance with an embodiment of the present invention.

FIG. 11 shows a schematic block diagram 200 illustrating the connection of External Networks and Public Switched Phone Networks to a LAN to which network telephones are connected, in accordance with an embodiment of the present invention. As previously described, any number of network devices D11–D15, D21–D25, D51–55 may be network phones. To connect internally generated calls from the network phones D11–D55 to Public Switched Telephone Networks (PSTN) 208, an interfacing device called a Trunk Line Card/Digital Attendant is required. The Trunk Line Card interfaces the analog circuitry of the outside phone lines (PSTN) to the digital circuitry required by a digital attendant. In the present embodiment, both functions are included in device 204. The Digital Attendant converts the MAC (media access control) addresses used by the LAN devices (including the network phones D11–D55) to telephone numbers understandable by standard telephone systems. The Digital Attendant, together with the trunk line card, convert the digital data streams representing the audio conversation to the frequency and signal levels of the outside phone lines. Trunk Line card/Digital Attendant 204 also serves to convert outside dialed connections to the appropriate MAC address of a network phone. The Digital Attendant/Trunk Line card 204 are either packaged together (for example on the same printed circuit board) and installed in a PC, or packaged separately. If separately packaged, the digital attendant is housed in a stand alone console with various types of display indicators (LEDs, LCD displays, etc) and controls to intercept and direct calls within the LAN system.

In like manner, calls originating from a External Network 206 are interfaced through a Data Network Line Card line card/digital attendant 202 for conversion to/from MAC addresses utilized by the network phones. External Network 206 may be a wide area network (WAN) such as the Internet, a Virtual Private Network (VPN), or may be implemented by more local communication systems utilizing microwave, laser, or buried cable for building to building or intercampus connections. It may be convenient to limit LAN coverage to within a given building or structure, for example, and utilize a microwave or laser based system for building to building or structure to structure communication. For communication with locations farther apart, the use of Internet or a VPN may be suitable. In this case, the Data Network Line Card/digital attendant line card 202 and network phones are programmed to support Internet protocols. Data Network Line Card 202 and Trunk Line Card/Digital Attendant 204 may, for example, reside in a PC connected to the LAN, or may each be a separate device. The capability may additionally be built into Switch10 192 or into a separate console type device as described above.

Figure 12A:
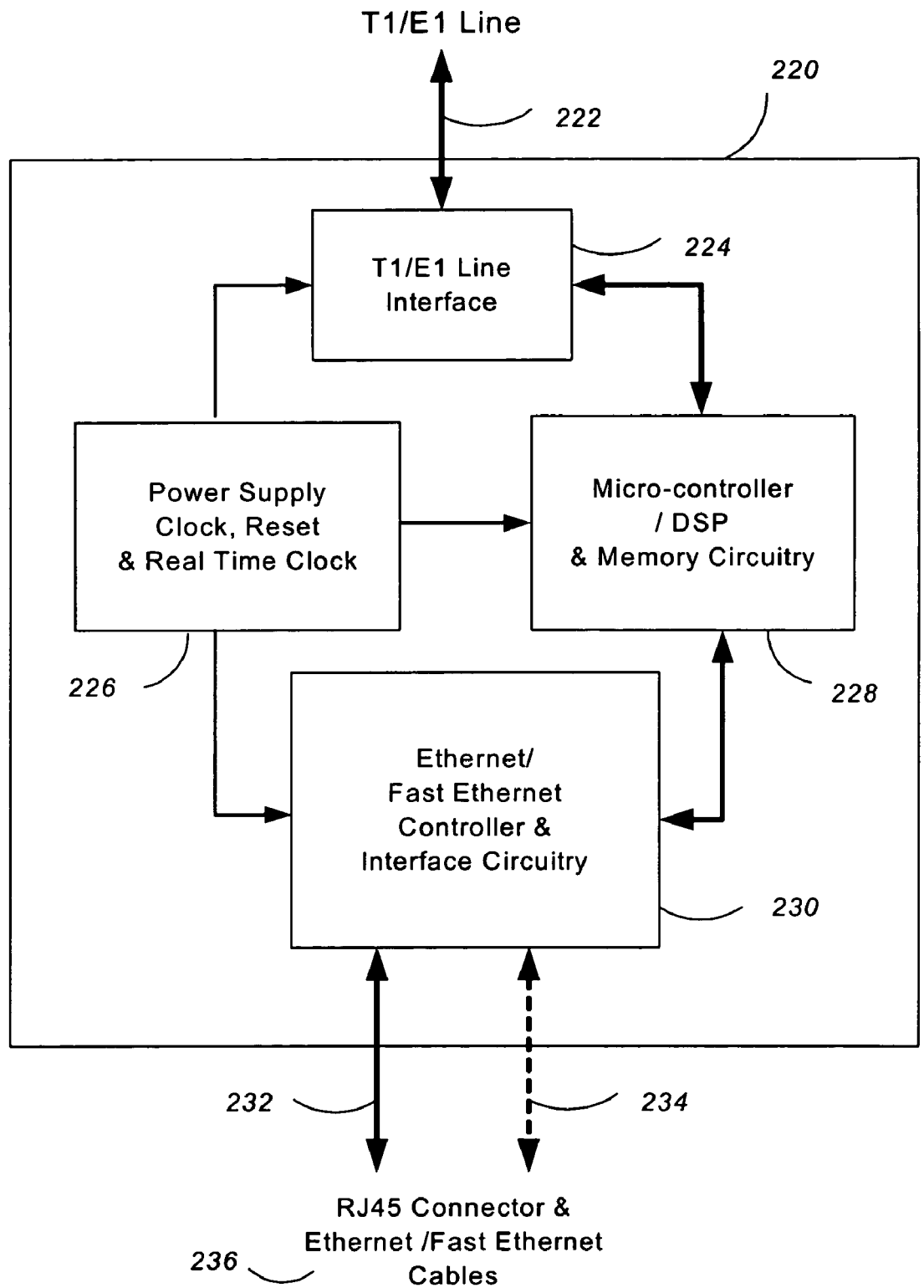
FIG. 12A shows a functional block diagram of a trunk line card in accordance with an embodiment of the present invention.

FIG. 12A shows a functional block diagram of a Trunk Line Card 220, in accordance with an embodiment of the present invention. This embodiment provides for connection to T1/E1 lines 222, but may be configured for other PSTN phone line configurations as well, with no loss in functionality. A T1/E1 line interface circuit 224 is coupled to micro-controller/DSP & memory circuitry 228, which, in turn, is coupled to Ethernet controller and Interface circuitry 230. RJ45 connectors 236 are supplied to connect the Trunk Line Card 220 to the LAN system. Single line 232 or an additional auxiliary line 234 or more, can be provided. Power supply, clocking, and reset-circuitry is supplied to components 224–230 via Power Module 226.

Figure 12B:
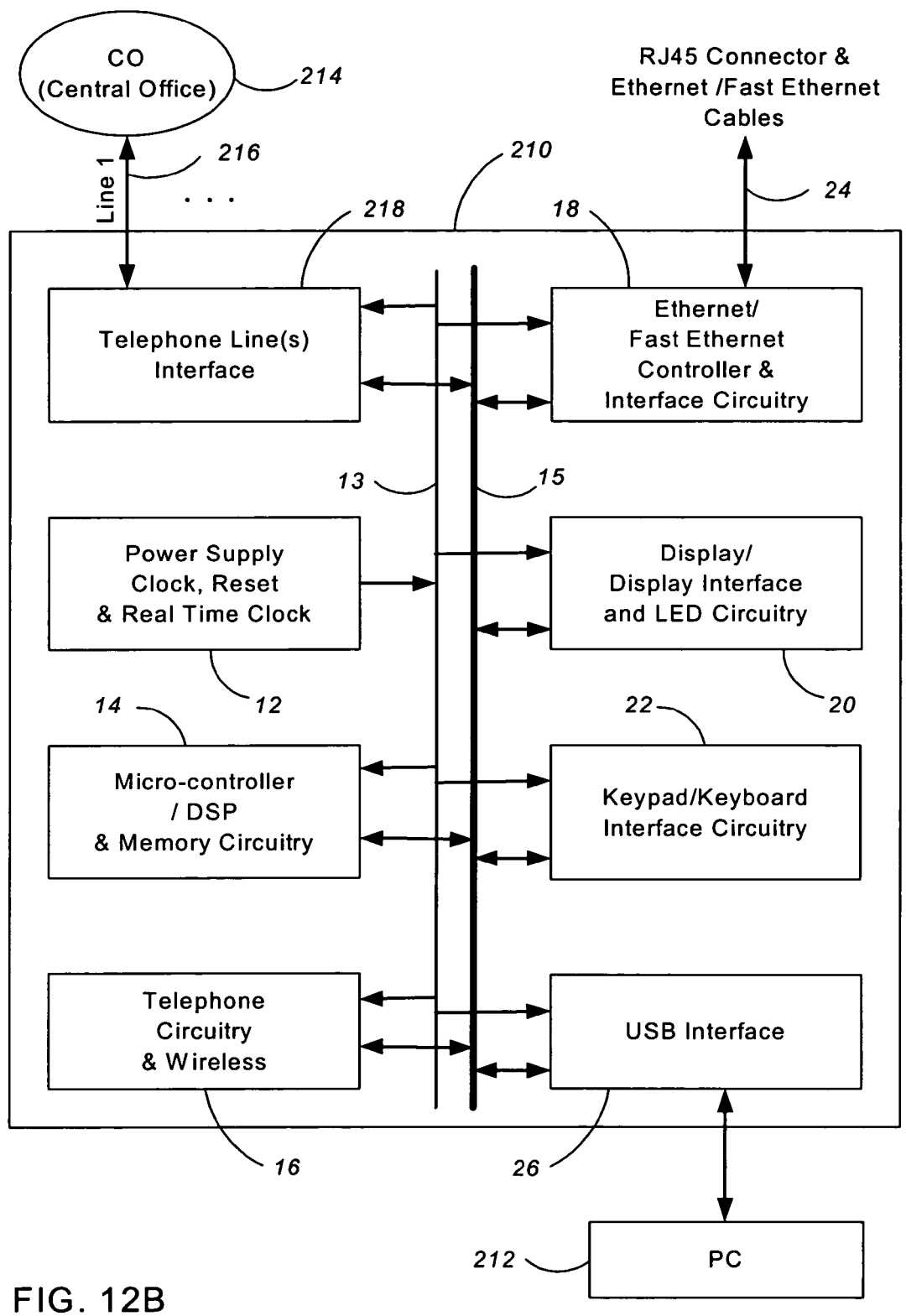
FIG. 12B shows a functional block diagram of a Digital Attendant in accordance with an embodiment of the present invention.

FIG. 12B shows a block diagram of a Digital Attendant 210, in accordance with an embodiment of the present invention. The circuitry is similar to the embodiments illustrated in FIGS. 1 and 12A, but adds additional features as well. The Digital Attendant 210 can be provided with these additional interface features through use of the PC 212, which may allow a user to implement a human operator interface as part of the attendant function. The PC 212 allows for a video screen display with GUI programming to allow the operator to easily determine the status of callers in the network and direct incoming calls. To connect with the central office 214 through line 216, or more lines, a circuit module 218 has been added to the embodiment of FIG. 1. PC 212 is shown connected to USB interface 26.

Figure 13:
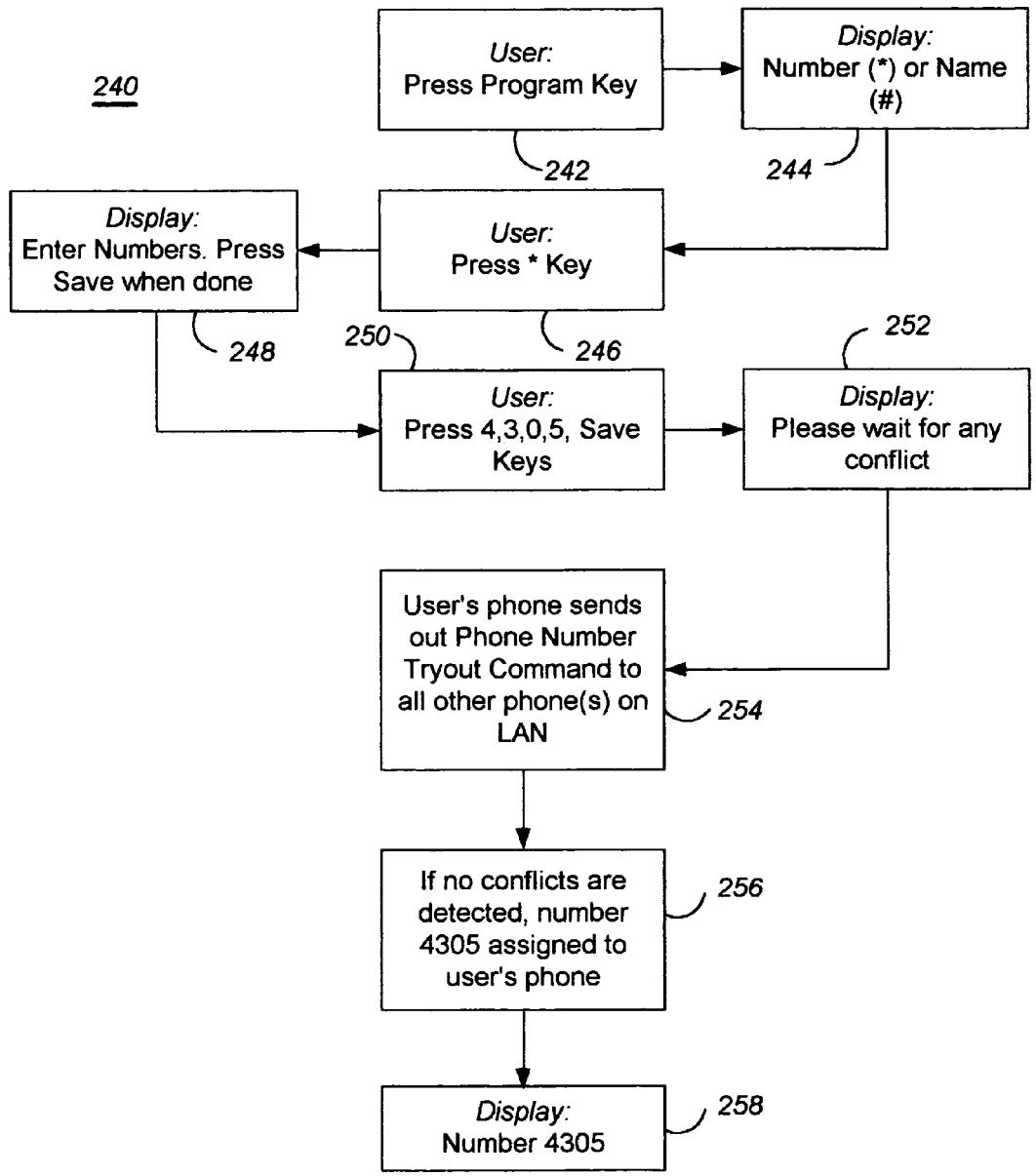
FIG. 13 shows flow chart illustrating the process for programming a phone number in accordance with an embodiment of the present invention.

FIG. 13 shows flow chart illustrating the process 240 for programming a phone number, in accordance with an embodiment of the present invention. In this process, the user manually programs a particular phone extension number 4305 into the user's extension by starting at step 242 and pressing the Program key 66*b*. In the next step 244, the phone display 62 in FIG. 4A, indicates a choice of Number (*) or Name (#). In step 246, the user presses the (*) key to program a number. In step 248, the display 62 prompts the user to enter the numbers and press the Save key 66*a*, when complete. In step 250, the user presses the 4, 3, 0, 5, and Save keys. In step 252, the display 62 instructs the user to wait while the phone checks for phone number conflicts elsewhere on the LAN. In step 254, the network phone sends out the 'Phone Number Tryout' command to all other network phones on the LAN. If no other phone responds with "4305 in current use", number '4305' is assigned to the user, in step 256. All other phones will update their look up tables (LUTs) with the new number, such as shown in step 726, in FIG. 23. The number will be displayed on the user's phone, in step 258.

Figure 14:
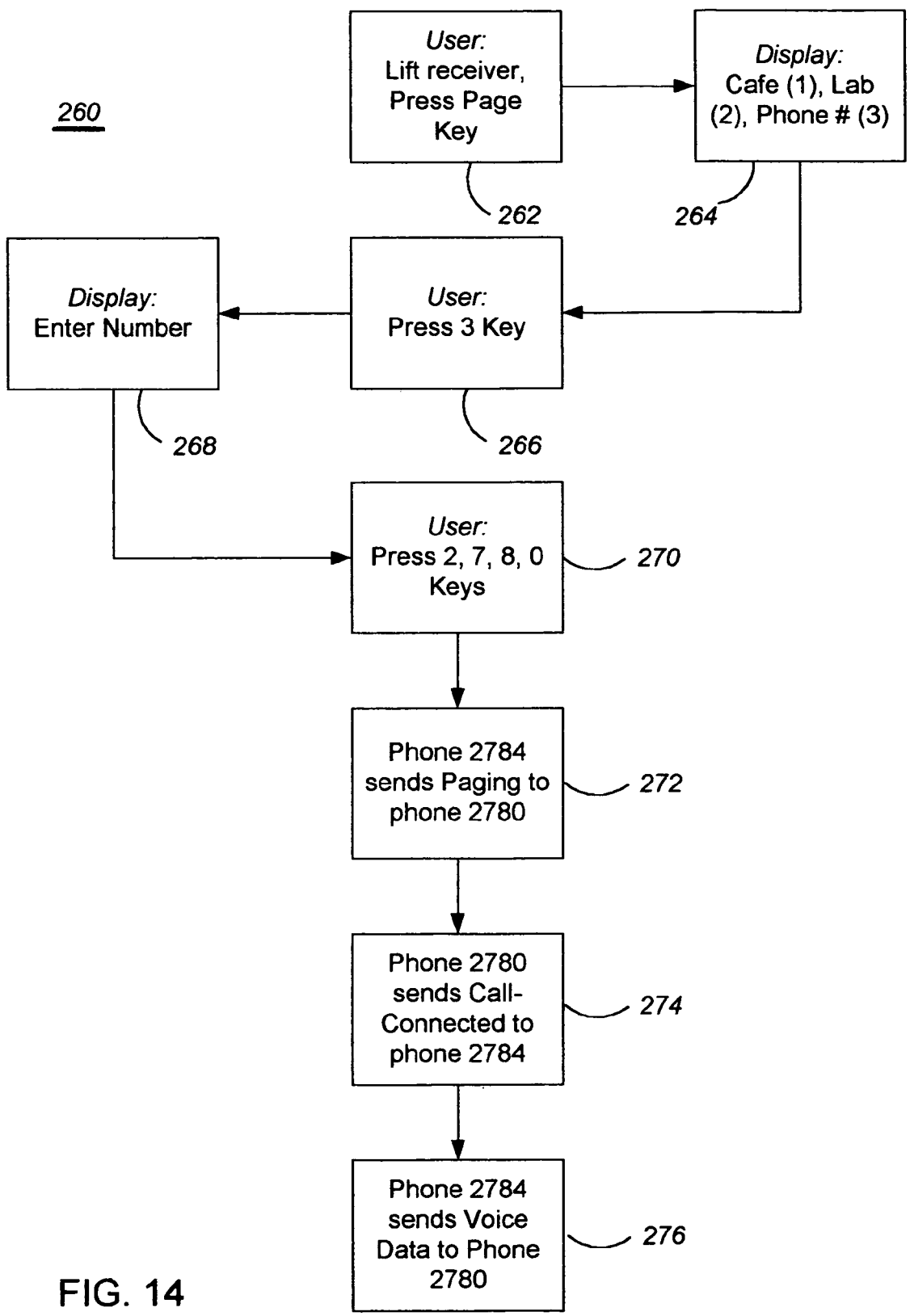
FIG. 14 shows a flow chart illustrating the process for paging in accordance with an embodiment of the present invention.

FIG. 14 shows a flow chart illustrating a process for paging, in accordance with an embodiment of the present invention. The user starts the process by lifting the handset and pressing the Page key 66*c*, in step 262. The display prompts the user for a choice, in step 264. In this example, the user chooses Phone #, choice (3), in step 266, by pressing the 3 key. In step 268, the display prompts for the phone number to which the page is to be directed. In this example, the user enters '2780' by pressing 2, 7, 8, 0 keys, in step 270. In step 272, phone '2784' sends a paging command to phone '2780'. In step 274, phone '2780' sends the phone at '2784', a 'Call-connected' command. In step 276, the phone at '2784' sends voice data to phone at '2780'.

Figure 15:
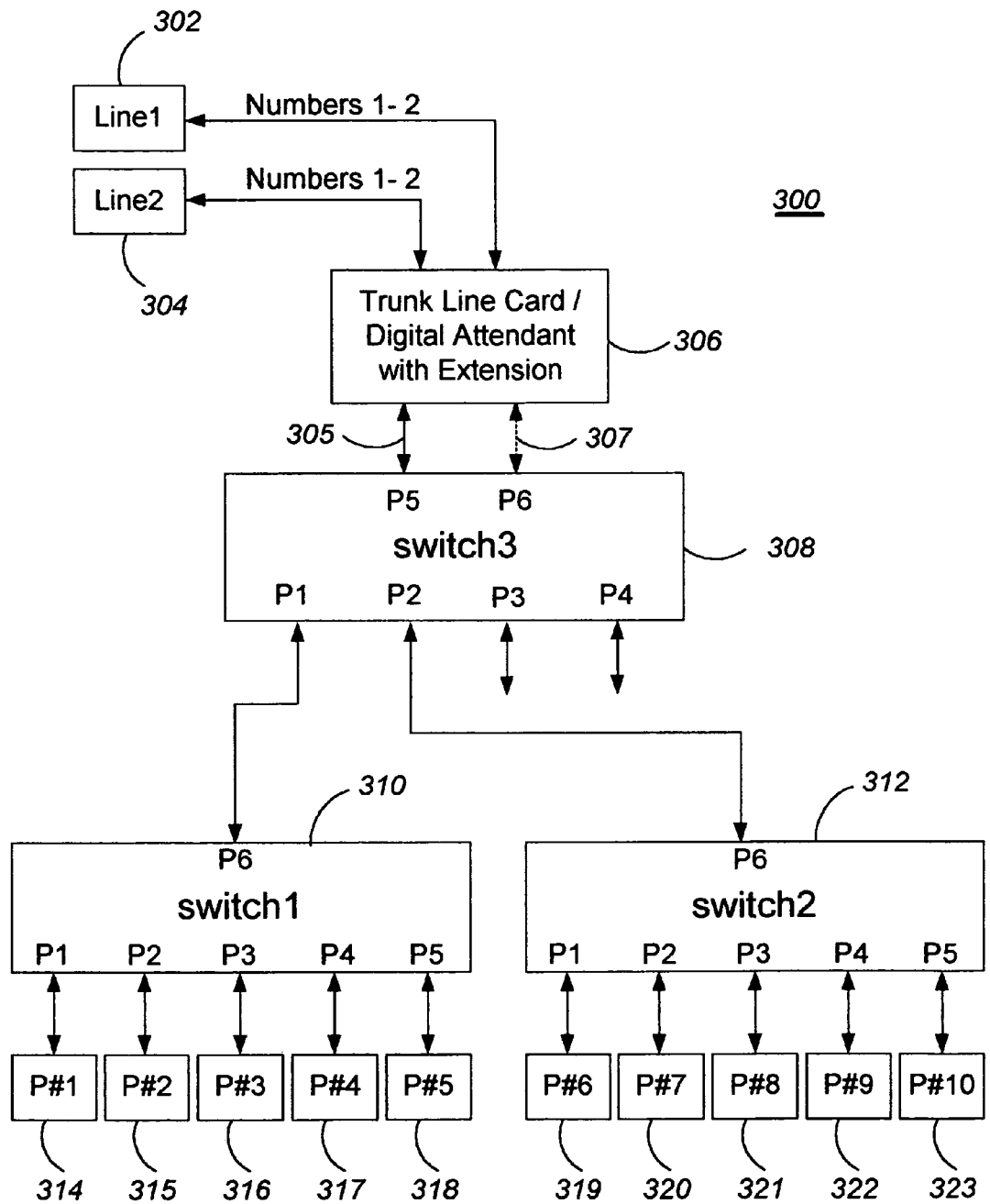
FIG. 15 shows a block diagram illustrating the connection of multiple network telephones with two outside phone lines and two phone numbers in accordance with an embodiment of the present invention.

FIG. 15 shows a block diagram 300 illustrating the connection of multiple network telephones with two outside phone lines 302, 304 in accordance with an embodiment of the present invention. Phone lines 302, 304 are coupled to a Trunk Line Card/Digital Attendant device 306. Trunk Line Card/Digital Attendant device 306 is normally supplied with one port 305, but optionally has a second port 307 for increased capacity. Trunk Line Card/Digital Attendant device 306 is coupled to six-port LAN switch 308, which in turn is coupled to six-port LAN switches 310 and 312. Network phones P#1 314 through P#5 318 are coupled to switch 310, and network phones P#6 319 through P#10 323 are coupled to switch 312.

In this embodiment, only two lines and two phone numbers are assigned by the phone company. As a result, only two open lines are available at any one time between users on phones P#1–P#10. Device 306 includes an extension identification utility that allows an incoming caller to pick an appropriate extension to which the call is directed. Such a utility can be completely automated, with prerecorded selections that allow the incoming caller to access directories of all internal phone extensions. Or, if preferred, trunk line card/digital attendant device 306 can be set up to provide human operator intervention to route calls.

Figure 16:
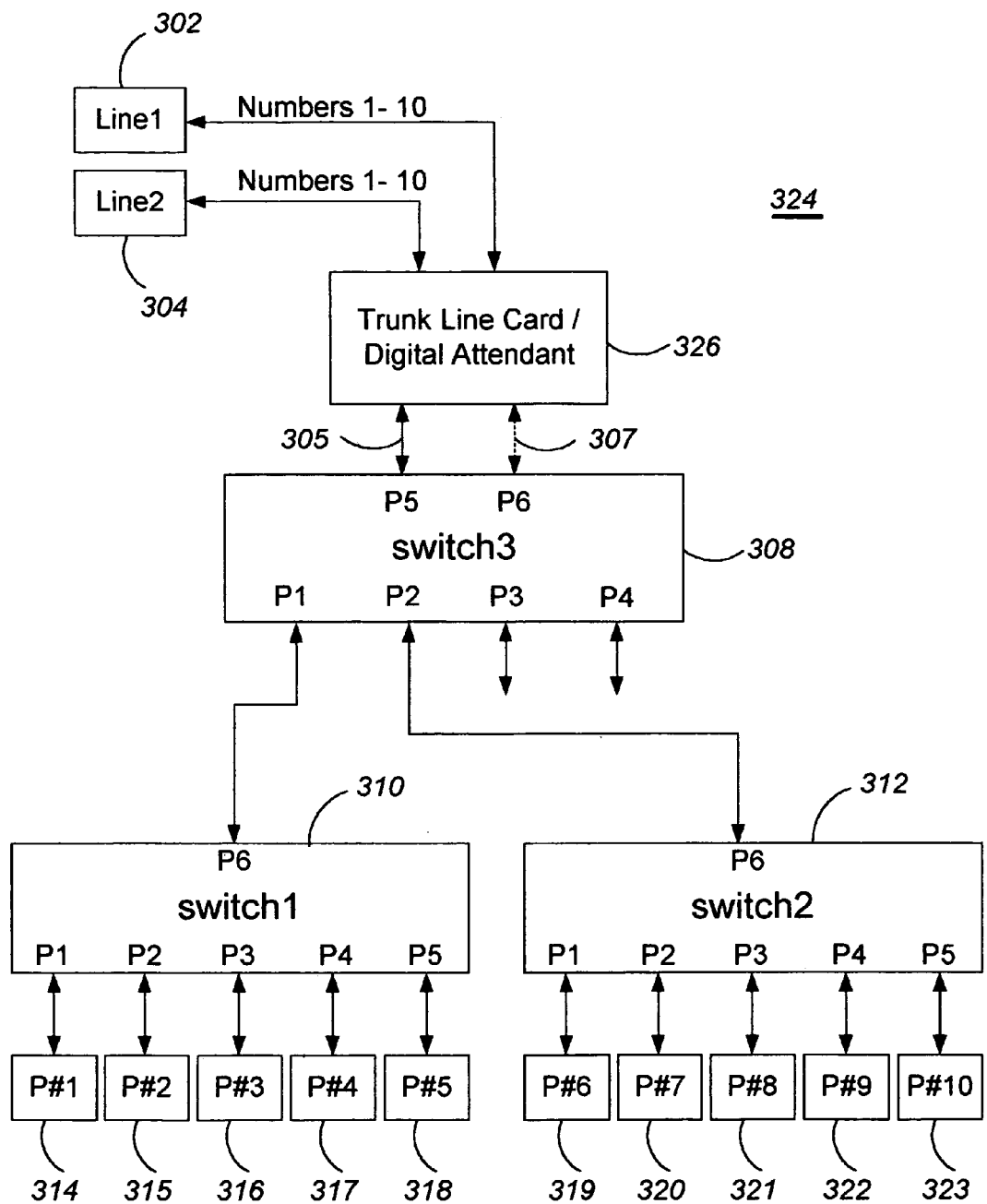
FIG. 16 shows a block diagram of the system of FIG. 15 with multiple phone numbers in accordance with an embodiment of the present invention.

FIG. 16 shows a block diagram 324 of the system of FIG. 15 with multiple outside telephone numbers in accordance with an embodiment of the present invention. In this embodiment, enough phone numbers have been allocated to allow a direct dial connection from an outside caller to each user at phones P#1–P#10. Module 326 no longer requires the extension access capability.

Figure 17:
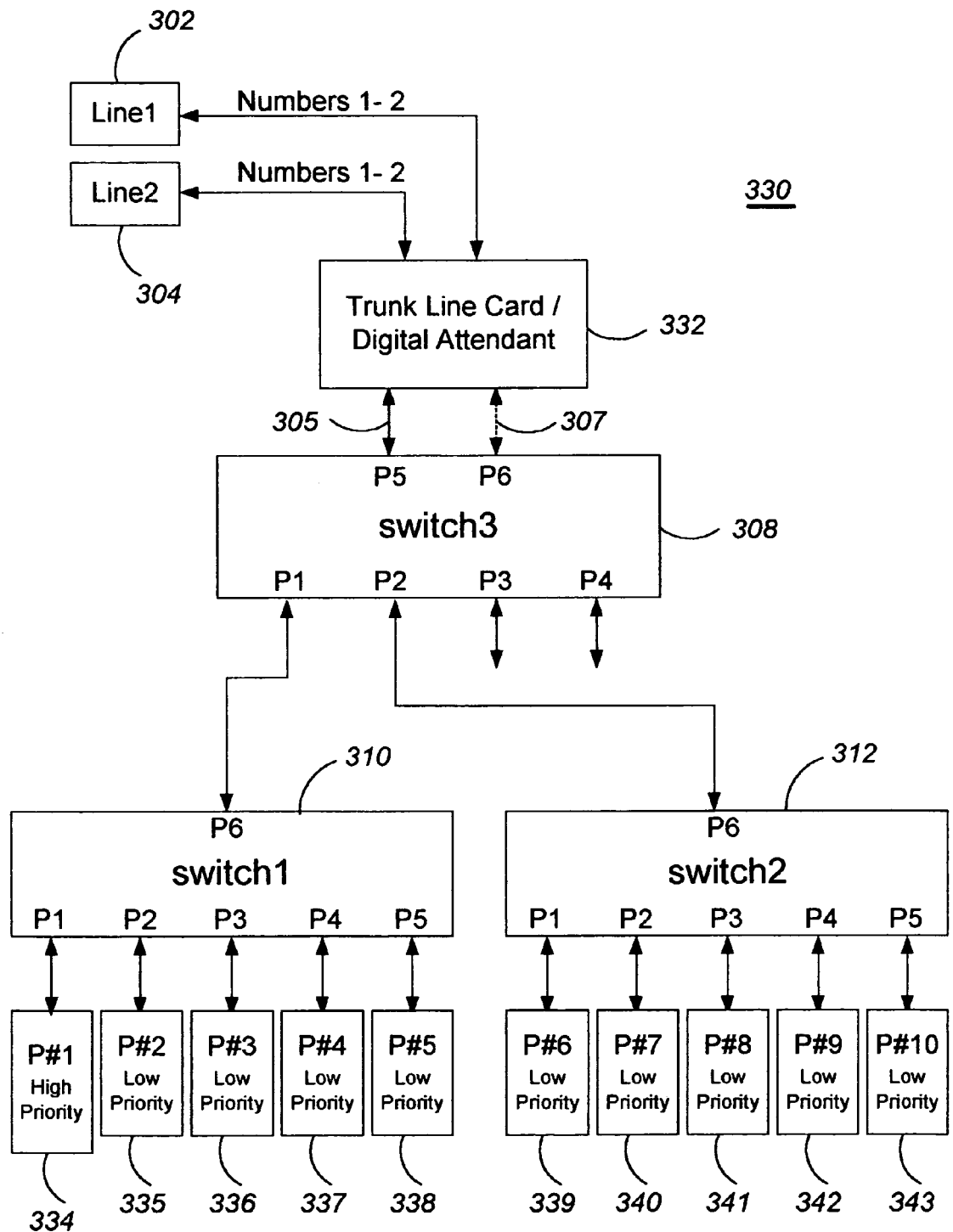
FIG. 17 shows a block diagram of the system of FIG. 15 designating one telephone of highest priority in accordance with an embodiment of the present invention.

FIG. 17 shows a block diagram 330 of the system of FIG. 15 except that one telephone is designated to have the highest priority, in accordance with an embodiment of the present invention. In this embodiment, only two phone numbers are provided, and network phone P#1 334 is designated highest priority. This causes all incoming calls are directed to P#1, and if P#1 is busy, the attendant module 332 directs the caller to choose an extension to which to direct the call. The call is then directed to one of phones P#2–P#10. This embodiment may be useful for organizations that wish to direct all calls through a receptionist or operator, for example. After hours or when the receptionist is unavailable, calls are forwarded directly to a chosen extension.

Figure 18:
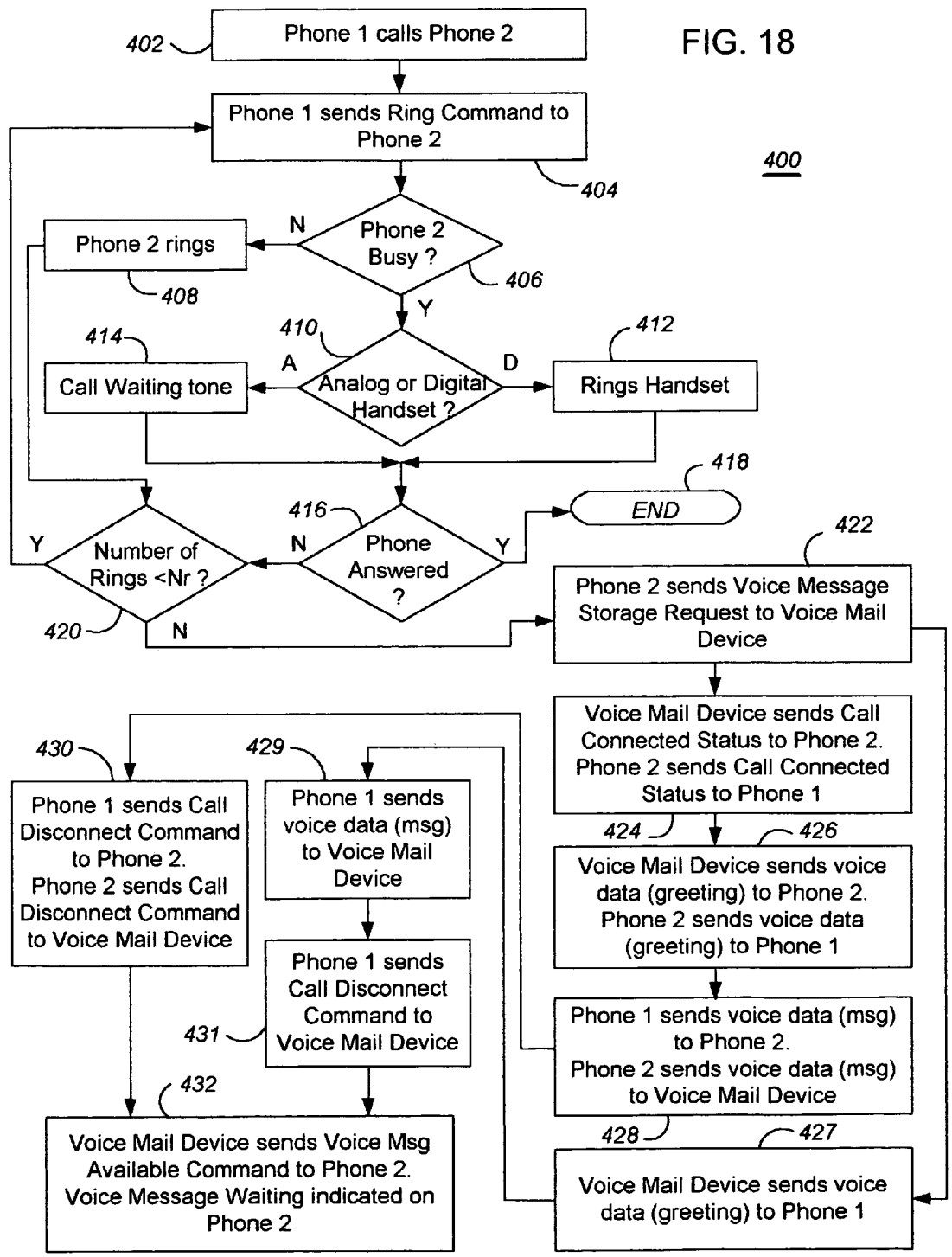
FIG. 18 shows a flow chart illustrating the processing steps for the voice mail function in accordance with an embodiment of the present invention.

FIG. 18 shows a flow chart 400 illustrating the processing steps for the voice mail function, in accordance with an embodiment of the present invention. The process starts at step 402 with phone 1 calling phone 2. In step 404, phone 1 sends a 'Ring' command to phone 2. If phone 2 is not busy, as determined in step 406, the phone 2 rings, in step 408. Next, in step 420, the number of rings is compared with a preset value NR and, if the number of rings does not exceed the preset value, as determined in step 420, the process continues at step 404. If the number of rings does exceed the preset value NR, as determined in step 420, the caller begins the voice mail function at step 422.

If phone 2 is busy, as determined in step 406, the type of handset for phone 2 is determined in step 410. If the handset is analog, as determined in step 410, a call waiting tone is generated, in step 414, for the user on phone 2. If the handset is digital, as determined in step 410, the handset is rung, in step 412. In both steps 412 and 414, the user on phone 2 is allowed to interrupt the current call and pickup the incoming call from phone 1, in step 416.

If the phone is answered, as determined in step 416, the process ends. If the phone is not answered, as determined in step 416, the user at phone 1 has decided not to interrupt his current call and the number of ring attempts is again determined in step 420. If the number of ring attempts exceeds NR, then the caller on phone 1 begins the voice mail function at step 422.

At step 422, phone 2 sends a 'Voice Message Storage Request' command to the voice mail device. In step 424, the voice mail device sends a 'Call Connected Status' message to phone 2, and phone 2 sends a 'Call Connected Status' message to phone 1. In step 426, the voice mail device sends voice data ("leave a message" greeting) to phone 2, and phone 2 forwards the voice data (greeting) to phone 1. In step 428, phone 1 sends voice data (the message) to phone 2, which sends it to the voice mail device. In step 430, phone 1 sends phone 2 a 'Call Disconnect' command, and phone 2 forwards to the voice mail device the 'Call Disconnect' command. In step 432, the voice mail device sends a 'Voice Message Available' command to phone 2, and the Voice Message Available Indicator Lamp 67 is lit thereon to so indicate. Optionally, display 62 displays a '1 Msg Available' message.

In an alternative embodiment, the voice mail device sends the voice data (greeting) directly to phone 1, in step 427 following step 422. In step 429, phone 1 sends the voice data (message) to the voice mail device and, in step 431, phone 1 sends the 'Call Disconnect' command to the voice mail device. In step 432, the voice mail device sends a 'Voice Message Available' command to phone 2, which lights the Voice Message Available Indicator Lamp 67.

Figure 19:
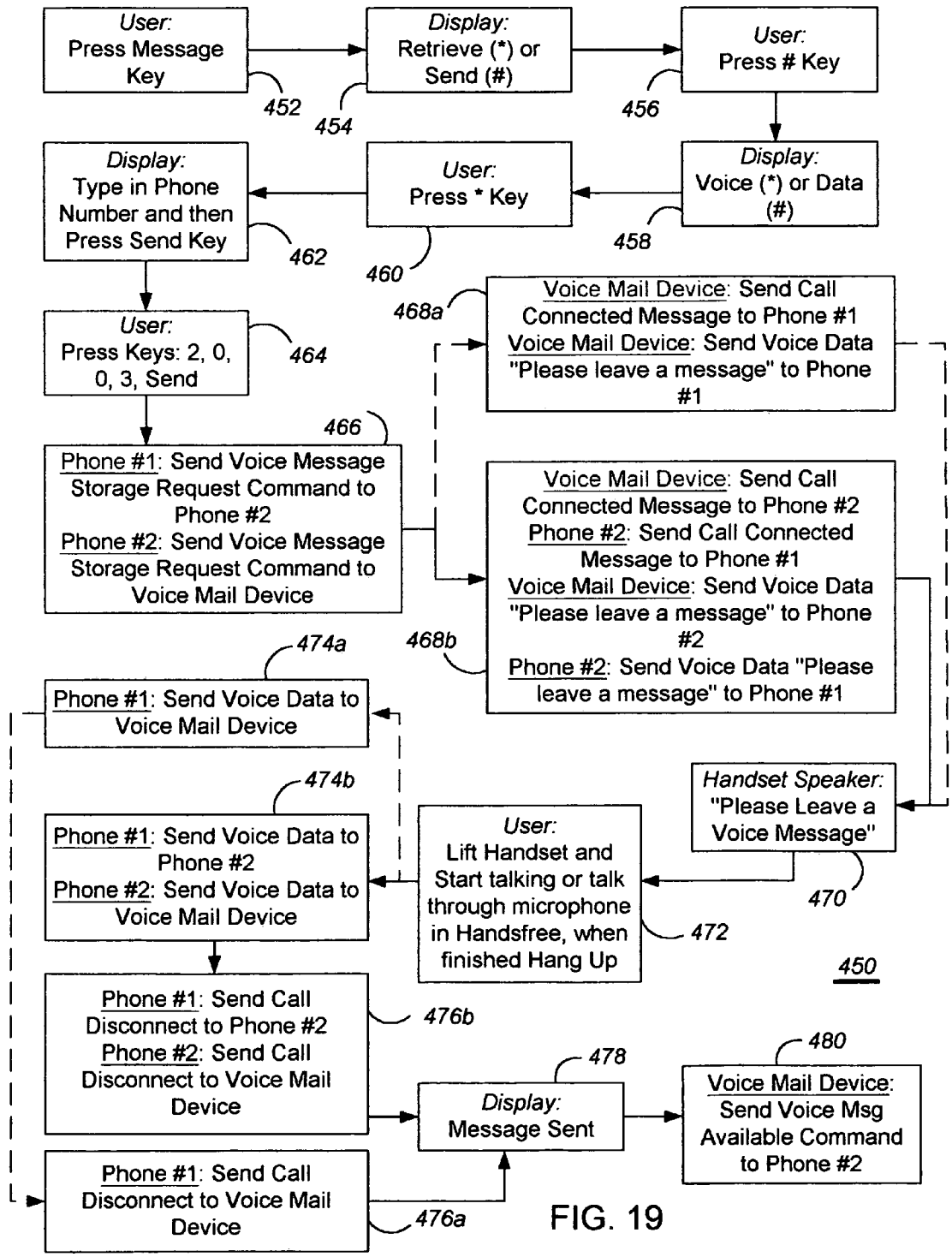
FIG. 19 shows a flow chart illustrating the process of transmitting a voice message between network telephones in accordance with an embodiment of the present invention.

FIG. 19 shows a flow chart 450 illustrating the process of transmitting a voice message between network telephones, in accordance with an embodiment of the present invention. In this process, the user on phone #1 leaves a voice message for the user at phone #2 without ringing phone #2. In step 452, the user at phone #1 presses the Message key 66*e*. In step 454, the display 62 at phone #1 prompts "Retrieve (*) or Send (#)". In step 456, the user presses the (#) key, making the choice to send a message. The display, in step 458, then prompts "Voice (*) or Data (#)". In step 460, the user presses the (*) key, selecting to send a voice message. In step 462, the display prompts the user to enter the phone number and press the Send key 66*d*. In step 464, the user enters the number of phone #2 (in this case '2003'), and presses the Send key.

Step 466 indicates the subsequent message traffic between phone #1, and phone #2. Phone #1 first sends a 'Voice Message Storage Request' command to phone #2. Phone #2 then sends a 'Voice Message Storage Request' command to the voice mail device.

In a first alternative following step 466, the voice mail device sends a 'Call Connected' message to phone to phone #1, and a voice data (the "greeting") to phone #1, in step 468*a*.

In a second alternative following step 466, the voice mail device sends a 'Call-connected' message to phone #2, which then sends a 'Call-connected' message to phone #1, in step 468*b*. Also, in step 468*b*, the voice mail device sends a voice data (the "greeting") directly to phone #2, which then sends a voice data greeting to phone #1.

At phone #1, the user hears the "greeting" on speaker, in step 470. In step 472, the user records the voice message.

In a first alternative following step 472, phone #1 sends the voice message recorded by the user directly to the voice mail device, in step 474*a*.

In a second alternative following step 472, phone #1 sends the voice message to phone #2, which in turn sends the message to the voice mail device, in step 474*b*. In step 476*a*, phone #1 sends a 'Call-Disconnect' message to the voice mail device. In step 476*b*, phone #1 sends the 'Call Disconnect' command to phone #2, which then sends the 'Call Disconnect' command to the voice mail device.

In step 478, the display indicates the message has been sent and, in step 480, the voice mail device sends a 'Voice Message Available' command to phone #2, resulting in the message indicator 67 illuminating at phone #2.

Figure 20:
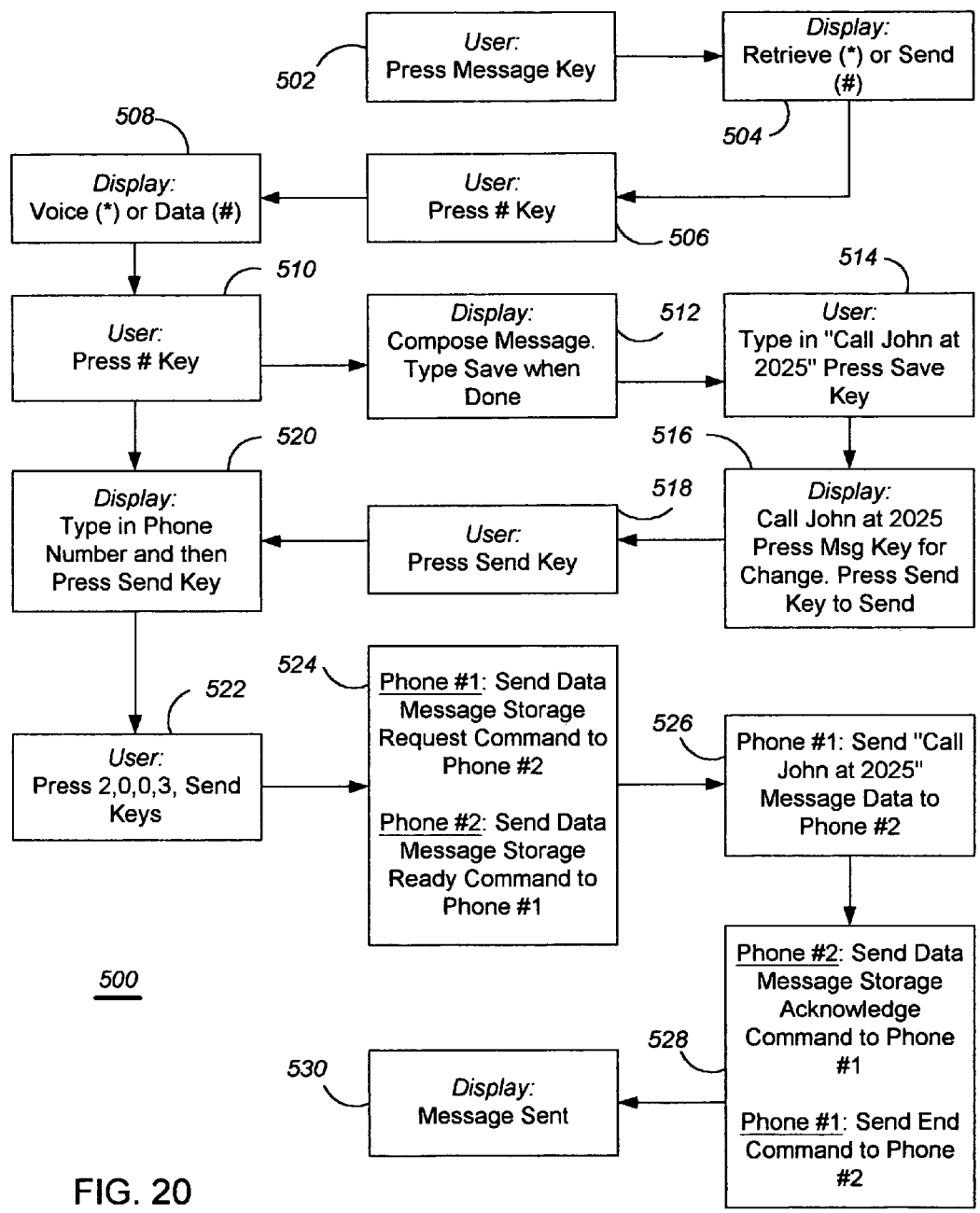
FIG. 20 shows a flow chart illustrating the process of transmitting a character data message in accordance with an embodiment of the present invention.

FIG. 20 shows a flow chart 500 illustrating the process of transmitting a character data message, in accordance with an embodiment of the present invention. In this process, the user on phone #1 leaves a data (or character) message for the user at phone #2 without ringing phone #2. In step 502, the user at phone #1 presses the Message key 66*e*. In step 504, the display 62 at phone #1 prompts "Retrieve (*) or Send (#)". In step 506, the user presses the (#) key, making the choice to send a message. The display, in step 508, then prompts "Voice (*) or Data (#)". The user presses the (#) key to select data, in step 510. In step 512, the display prompts the user to type in the data message and press Save 66*a*. In step 514, the user types in the message "Call John at 2025" and presses the Save key. In step 516, the display indicates the message just entered, followed by instructions to press the Message key 66*e* to change the message or press the Send key 66*d* to send. In step 518, the user presses the Send key. The display then prompts the user for the destination phone number, in step 520. In step 522, the user types in the phone number of phone #2 (in this case 2003) and presses Send key.

In step 524, phone #1 sends a 'Data Message Storage Request' command to phone #2 which then sends a 'Data Message Storage Ready' command back to phone #1. In step 526, phone #1 sends the data message to phone #2. In step 528, phone #2 sends a 'Data Message Storage Acknowledge' command to phone #1 which sends an 'End' command to phone #2. In step 530, phone #1 display indicates the message has been sent, and the message indicator 67 illuminated at phone #2.

Figure 21:
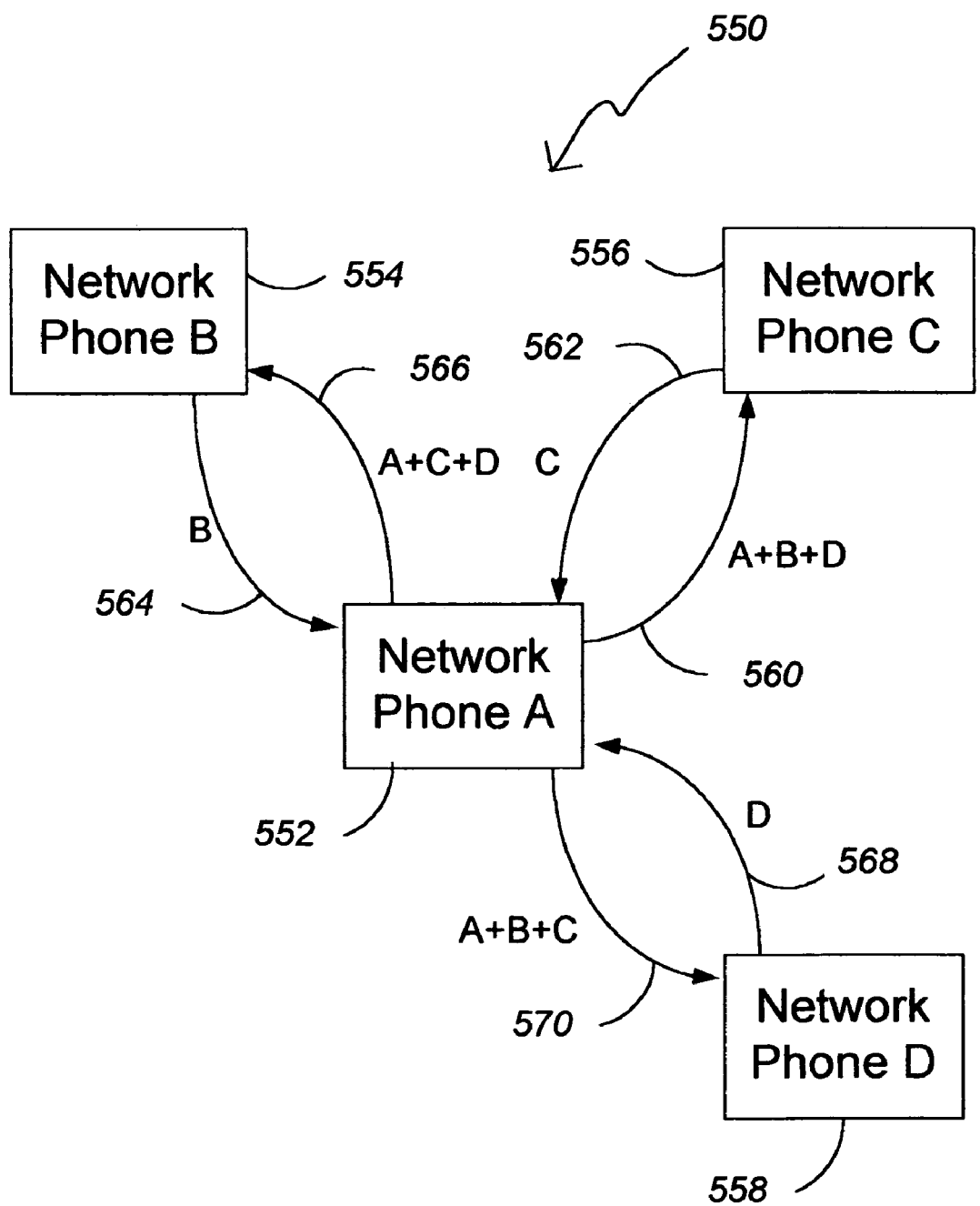
FIG. 21 shows a flow chart illustrating the process of communicating between network telephones during a conference call in accordance with an embodiment of the present invention.

FIG. 21 shows a flow chart 550 illustrating the process of communicating between network telephones during a conference call, in accordance with an embodiment of the present invention. In this example, network phone A 552 sets up a conference call between network phone B 554, network phone C 556, and network phone D 558. Voice data traffic from network phone B is sent to phone A via path 564, and voice data traffic from all the other phones in the conference call is routed to phone B through network phone A via path 566. Similarly, voice data traffic from phone C is routed to phone A via path 562, and voice data traffic from all the other phones in the conference call are routed to phone C through network phone A via path 560. Voice data traffic from phone D is routed to phone A via path 568, and voice data traffic from all the other phones in the conference call are routed to phone D through network phone A via path 570.

Figure 22A:
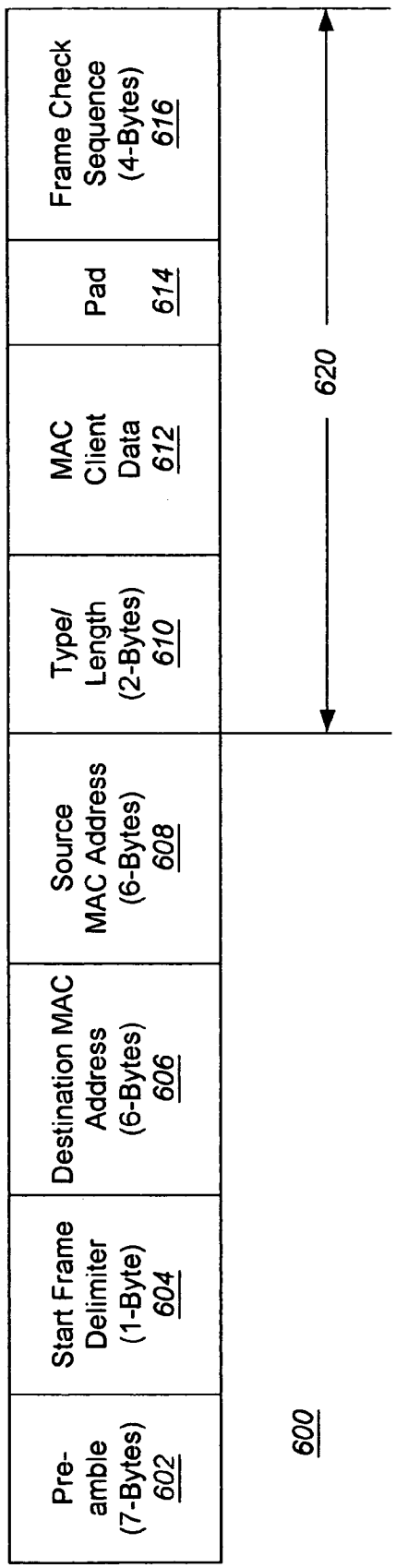
FIG. 22A shows a diagram illustrating the prior art structure of an Ethernet data transmission frame.

FIG. 22A shows a diagram 600 illustrating the prior art structure of an Ethernet data transmission frame. The protocol and data structure are in accordance with the IEEE 802.3 standard, and represent how digital information is transmitted from one device to another in an Ethernet LAN system. Because the transmission of data in an Ethernet system is basically serial in nature, the data transmission frame contains information, arranged in a sequential fashion, about the destination device identity and address, the source device identity and address, the data to be transmitted, and buffer information to identify the start and end of the frame.

The start of the data frame begins with a preamble 602 of 7 bytes representing a sequence of 56 bits having alternating 1 and 0 values that are used for synchronization. They serve to give components in the network time to detect the presence of a signal, and prepare to read the signal before the frame data arrives. Following the preamble 602 is a 1-byte segment called a start frame delimiter 604, which is a sequence of 8 bits '10101011' indicating the start of the frame. The start frame delimiter 604 is followed by the destination Media Access Control (MAC) address 606 and the source MAC address 608. The destination MAC address field 606 identifies the station that are to receive the frame. The source MAC address identifies the station that originates the frame. The IEEE 802.3 standard permits these address fields to be either 2-bytes or 6-bytes in length, but most current Ethernet implementations use 6-byte addresses. A destination address may specify either an "individual address" for a single station, or a "multicast address" for a group of stations. A destination address of all 1 bits refers to all stations on the LAN and is called a "broadcast address". The type/length field 610 is used to indicate the nature of the MAC client protocol, or the length of data in the subsequent MAC client data field 612. If the value of this field 610 is less than or equal to 1500, then the type/length field 610 indicates the number of bytes in the MAC client data field 612. If the value of this field is greater than or equal to 1536, then the type/length field 610 indicates the nature of the MAC client protocol (protocol type). The MAC client data field 612 contains the data to be transferred from the source station to the destination station or stations. The maximum size of this field is 1500 bytes. If the size of this field is less than 46 bytes, the use of the subsequent "Pad" field 614 is necessary to bring the frame to size up to the minimum length. A minimum Ethernet frame size is 64 bytes counting from the destination MAC Address field 606 through the frame check sequence field 616. The frame check sequence field 616 contains a 4-byte cyclical redundancy check (CRC) value used for error checking. When a source station assembles a MAC frame, it performs a CRC calculation on all the bits in the frame from the destination MAC address 606 through the pad field 614 (that is, all the fields except the preamble 602, start frame delimiter 604 and frame check sequence 616). The source station stores the values in this field and transmits it as part of the frame. When the frame is received by the destination station, it performs an identical check. If the calculated value does not match the value in this field, the destination station assumes an error has occurred during transmission and discards the frame.

While the present invention utilizes the format and protocol for communication in Ethernet LAN systems, in accordance with prior art established by the IEEE 802.3 standards, a new coding structure is established to enable operation of the network phones on an Ethernet LAN. Compatibility with the IEEE 802.3 protocol is maintained to assure that the network phones are compatible with and do not disrupt any existing devices connected to an Ethernet LAN system, as has been previously described in FIGS. 6–11, and FIGS. 15–17.

The network phone system described herein utilizes two basic data frame configurations as a basis for communication between network phone system components. A Type 1 (and 1A) frame is primarily utilized for transmitting voice or character data. A Type 2 frame is primarily utilized for transmitting commands. The distinguishing characteristics of each of the frame configurations are programmed into the fields 620 shown in FIG. 22A.

Figure 22B:
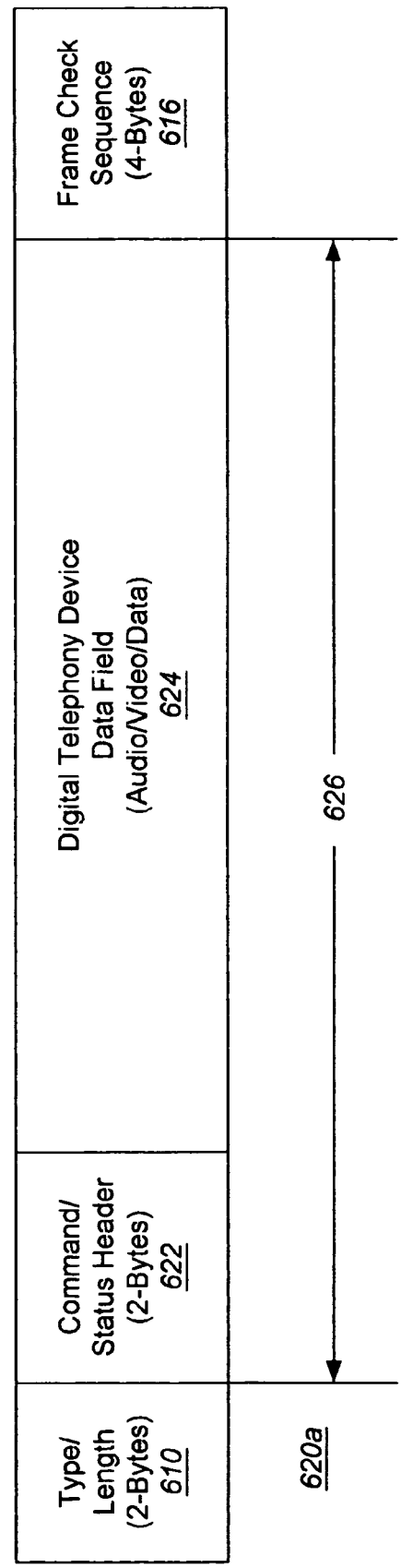
FIG. 22B shows a diagram illustrating a segment of the data transmission frame of FIG. 22A for a Type 1 Command in accordance with an embodiment of the present invention.

FIG. 22B shows a diagram illustrating a segment 620a of the data transmission frame of FIG. 22A for a Type 1 Command in accordance with an embodiment of the present invention. The Type 1 frame is primarily utilized for transmitting voice or character data (MAC Client data 612) equal to or greater than 46 bytes. Field 622 contains the command/status headers. Details are shown in Table 2. Field 624 contains the payload data, which is equal to or greater than 44 bytes for the Type 1 frame. The data contained in fields 612 and 614 of FIG. 22A is contained in field 626 of FIG. 22B. Information (coding) contained in field 626 is specific to the network phone embodiments of the present invention.

Table 2 contains the format and bit code information for the command status header field 622 in a Type 1 Command data frame. The command/status header includes two bytes of information, shown in the first and second columns labeled Byte 1 and Byte 2. Byte 1 codes are given by entries in the $2^{nd}$ through sixth rows. Byte 2 codes (Command/Status Codes) are shown in Table 4.

TABLE 2

| Byte 1 | Byte 2 | Description |
|---|---|---|
| xxxx:xxxx | yyyy:yyyy | Binary Bit Code, Command/Status xxxx:xxxx:yyyy:yyyy |
| ___:xxx__ | | accessory |
| ___:000__ | | network phone |
| ___:001__ | | USB port |
| ___:010__ to ___:111__ | | reserved |
| ___:___x | | count bit = 0, payload is ≧ 46 bytes for Type 1 frame |
| | yyyy:yyyy | Command/Status Code. See Table 4. |

Figure 22C:
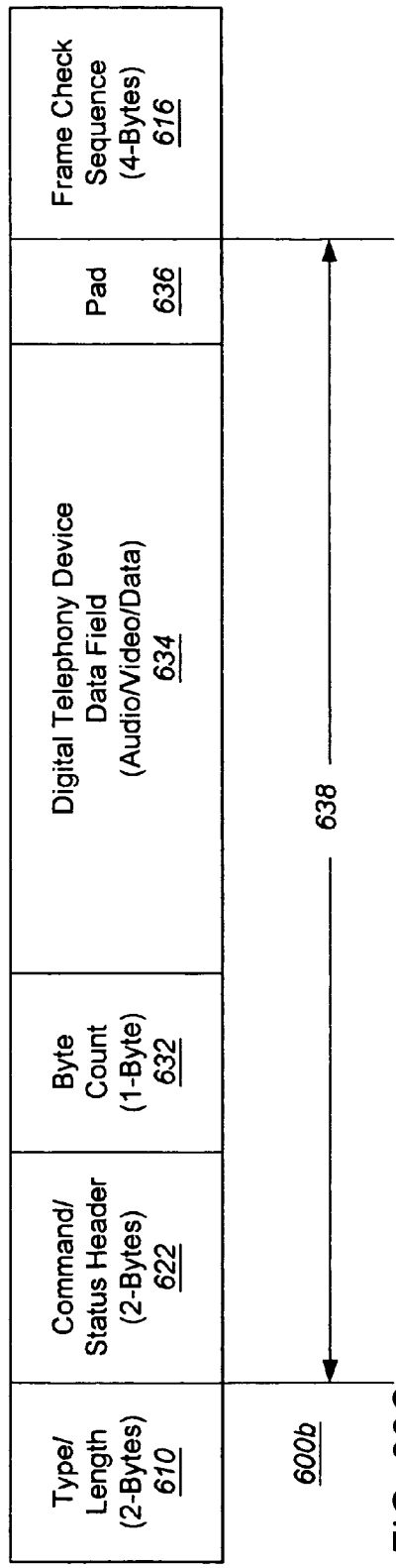
FIG. 22C shows a diagram illustrating a segment of the data transmission frame of FIG. 22A for a Type 1A Command in accordance with an embodiment of the present invention.

FIG. 22C shows a diagram illustrating a segment 620b of the data transmission frame of FIG. 22A for a Type 1A Command, in accordance with an embodiment of the present invention. The Type 1A frame is primarily utilized for transmitting voice or character data (MAC Client data 612) less than 46 bytes. Field 622 contains the command/status headers, as in the Type 1 frame. An additional field 632 is added to this frame to distinguish the important control and payload data from the pad in field 636. Details are shown in Table 3. Field 634 contains the payload data, which will be less than 43 bytes. The pad field 636 contains filler bytes of non-relevant information to bring the total length of field 638 to 46 bytes.

TABLE 3

| Byte 1 Command/Status | Byte 2 Command/ Status | Byte Count | Description |
|---|---|---|---|
| xxxx:xxxx | yyyy:yyyy | zzzz:zzzz | Binary Bit Code, Command/Status (2 bytes) xxxx:xxxx yyyy:yyyy |
| ___:xxx__ | | | accessory |
| ___:000__ | | | network phone |
| ___:001__ | | | USB port |
| ___:010__ to ___:111__ | | | reserved |
| ___:___x | | | count bit = 1, payload is < 46 bytes for Type 1A frame |

TABLE 3-continued

| Byte 1 Command/Status | Byte 2 Command/ Status | Byte Count | Description |
|---|---|---|---|
| | yyyy:yyyy | | Command Code. See Table 4. |
| | | zzzz:zzzz | Byte count |

Table 3 contains the format and bit code information for the command/status header field 622 and the Byte Count field 632 in a Type 1A Command data frame of FIG. 22C. The command/status header includes two bytes of information, shown in the first and second columns labeled Byte 1 and Byte 2. Byte 1 codes are given by entries in the $2^{nd}$ through sixth rows. Byte 2 codes are shown in Table 4. This table contains an additional column labeled 'Byte Count', which is the information contained in field 632, a single byte of information of value 0–43 that indicates the value in fields 634. The Byte Count is required because, without it, a device would be unable to distinguish the boundary between relevant data and pad bits. The Byte Count is not required for a Type 1 frame because there is no pad required; all data in the MAC Client field is relevant.

Figure 22D:
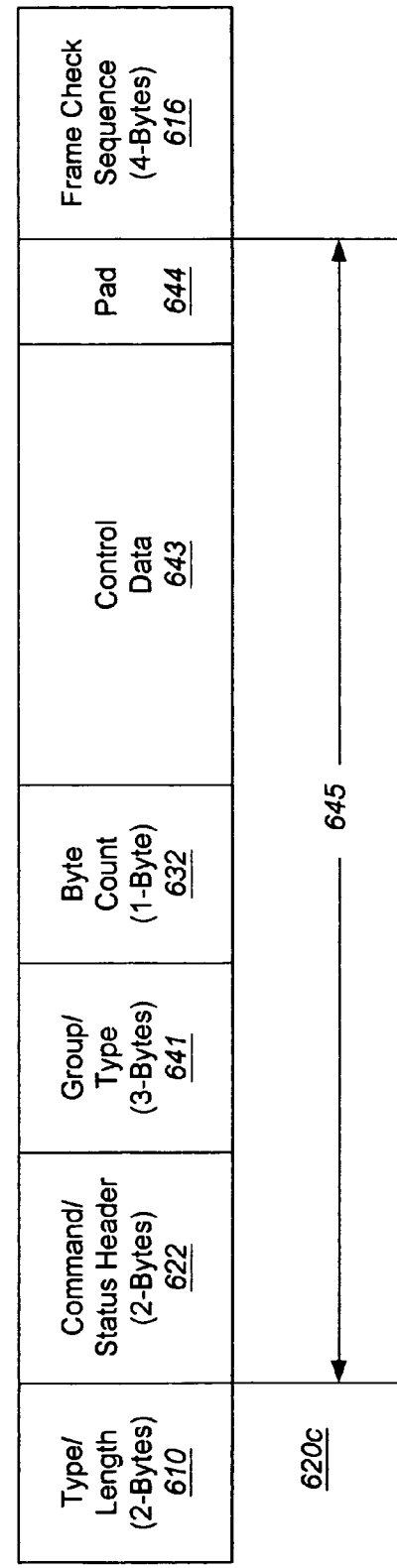
FIG. 22D shows a diagram illustrating a segment of the data transmission frame of FIG. 22A for a Type 2 Command in accordance with an embodiment of the present invention.

FIG. 22D is a diagram illustrating a segment 620c of the data transmission frame of FIG. 22A for a Type 2 Command, in accordance with an embodiment of the present invention. Type 2 commands are utilized primarily to transmit signaling or control and command data. The structure of fields 645 of FIG. 22D is the same as the structure of fields 638 of the previous FIG. 22C, except for the addition of the Group/Type field 641. The Command/Status header field 622 remains as described in Tables 2 and 3. The count bit equals 0 in Table 2 when the Control Data field 643 is greater than or equal to 40 bytes, and the count bit equals 1 in Table 3 when the Control Data field is less than 40 bytes. The Byte Count field 632 serves the same purpose as in the Type 1A command frame described above. When the Control Data field 643 is greater than or equal to 40 bytes, the Byte Count field 632 contains a value of 00. The pad field 644 serves the same purpose as that described in the Type 1A command frame, and contains non-relevant filler information only when Control Data field length is less than 40 bytes.

Table 4 shows the Command/Status codes in hexadecimal format of byte 2 as shown in column 2 of Tables 2 and 3. The entries in the table follow the form code:description, where 'code' is the second byte of the two byte hexadecimal number entered in field 622 of previous FIGS. 22B, 22C and 22D. Further explanation of the entries follows.

TABLE 4

00: Voice Data
01: Character Data (ASCII Data)
02: DTMF Data
03: Video Data
04: Hex Data
05–0F: Reserved
10: Ring (Initiate Call)
11: Ring Transfer
12: Call Ring Back
13: Ring Tone Status (normal ring)
14: Ring while Busy Tone Status
15: Phone Off-hook Status
16: Phone Busy
17: Call Connected
18: Call Transfer
19: Reserved TABLE 4-continued 1A: Call Disconnected (End Command)
1B: Attention (Link) Request
1C: Attention (Link) Acknowledge
1D: Command End
1E: Command Acknowledge
1F: Reserved
20  Phone Number Tryout (broadcast)
21: Phone Number Broadcast
22: Phone Name Broadcast
23: Reserved
24: Reserved
25: Phone Number Already Exists
26: Phone Directory Request
27: Broadcast Phone Directory Request
28: Phone Directory Broadcast
29: Phone Directory Transmit
2A: Phone Directory Received
2B: Reserved
2C: Reserved
2D: Phone Set Inventory Request Broadcast
2E: Device Tally Broadcast
2F: Device Group/Type Request
30: Device Group/Type Status
31: Device Group/Type Configure
32: Device Group/Type (Broadcast by Non Ethernet Phone)
33: Reserved
34: Reserved
35: Data Message Storage Request
36: Voice Message Storage Request
37: Data Message Storage Acknowledge
38: Reserved
39: Retrieve Data Message
3A: Retrieve Voice Message
3B: Retrieve Next Data Message
3C: Retrieve Next Voice Message
3D: Retrieve Previous Data Message
3E: Retrieve Previous Voice Message
3F: Retrieve Data Message N
40: Retrieve Voice Message N
41: Reserved
42: Reserved
43: Data Message Available
44: Voice Message Available
45: Delete Current Data Message
46: Delete Current Voice Message
47: Delete All Data Messages
48: Delete All Voice Messages
49: Reserved
4A: Reserved
4B: Data Message Deleted
4C: Voice Message Deleted
4D: Data Mail Box Empty
4E: Voice Mail Box Empty
4F: Data Mail Box Full
50: Voice Mail Box Full
51: Data Message Ready
52: Reserved
53: Password Request
54: Password Entry
55: Password OK
56: Password not OK
57: Reserved
58: Reserved
59: Remote Call Pickup
5A: Program Call Forward
5B: Paging
5C: Reserved
5D: Reserved
5E: Reserved
5F: Time Transmit
60: Date Transmit
61: Reserved
62: Call Log Request
63: Call Park Retrieve
64: Device Polling
65: Bridge Feature Program TABLE 4-continued 66: Device Activity Request
67: Device Activity Report
68: Device Account Open
69: Device Account Close
6A–DF: Reserved
E0: Retrieve Firmware Version
E1: Retrieve Hardware Version
E2: Reserved
E3: Reserved
E4: Firmware Version/Revision Number
E5: Hardware Version/Revision Number
E6: Reserved
E7: Reserved
E8: Reserved
E9: Transmit Data Loop Back
EA: Echo Data Loop Back
EB: Command Error Status
EC: Command Does not Exist
ED: Request
EE: Acknowledge
EF: Reserved
F0: Firmware Update Download Broadcast
F1: Firmware Update Download Request
F2: Firmware Update Download Transmit
F3: Firmware Download Acknowledge
F4: Key Map Download Request
F5: Key Map Download
F6–FF: Reserved For Type 1, 1A:

00: Voice Data. Voice Data sent/received by Network Telephone Device. The Network Telephone Device Data Field contains Digital Audio Data (Voice).

01: Character Data. Character (ASCII) Data sent/received by Network Telephone Device. The Network Telephone Device Data Field contains ASCII Data.

02: DTMF Data. Data sent/received by Network Telephone Device. The Network Telephone Device Data Field contains DTMF Data or Key pad Data. Refer to Table 1 for DTMF and Key pad values.

03: Video Data. Data sent/received by Network Telephone Device. The Network Telephone Device Data Field contains Video Data. Used by a USB Network Telephone Video Input Device such Digital Camera or Camera Recorder.

04: Hex Data. Hex Data sent/received by Network Telephone Device. The Network Telephone Device Data Field contains Hex Data.

05–0F: Reserved.

For Type 2:

10: Ring Command. Ring sent by Network Telephone Source Device. The Control Data field contains its phone number, name.

11: Ring Transfer Command. Command sent by Network Telephone Source Device to alert the calling device so it transfers its current Ring to a third party. The Control Data field contains MAC Address, Phone number, Name of the third party 12: Call Ring Back. Sent to Network Telephone Destination Phone to instruct it to call back the Network Telephone Source Device as soon as the user of the Destination Phone is off the phone (on-hook).

13: Ring Tone Status. Ring Tone Status sent back by Network Telephone Called Phone. The Control Data field contains its Phone Number, Name.

14: Ring while Busy. Ring while Busy Status sent by Network Telephone Called Phone. The Control Data field contains its Phone Number, Name.
15: Phone Off-hook. Sent by Network Telephone Called Phone that it is Off-hook. The Control Data field contains its Phone Number, Name.
16: Phone Busy. Busy Status sent by Network Telephone Called Phone. The Control Data field contains its Phone Number, Name.
17: Call Connected. The Call is Connected (goes off-hook) by the Called Device. This will signal the start of the Call Connection.
18: Call Transfer. The current Call is transferred to a third party. The Control Data field contains the MAC Address Phone Number, Name of the third party.
19: Reserved.
1A: Call Disconnected. The current Call is disconnected (goes from off-hook to on-hook).
1B: Attention Request. Request the Attention of the Called Device. Used to start a Link or Path to the Called Device.
1C: Attention Acknowledge. Inform the Caller Device that a Link or Connection has been established.
1D: Command End. Inform the Called Device that the current command is terminated.
1E: Command Acknowledge. Inform the Called Device that the current command is acknowledged.
1F: Reserved.
20: Phone Number Tryout (broadcast). Sent by the Network Telephone Source Phone to all Network Telephone Devices with its phone number in its Data Field when it is first hooked up to the LAN network. The Network Telephone Source Phone waits for some 'time-out' period to make sure that no same number exists in the network and sends out the broadcast message one more time to be absolutely sure that it can use the number. If there is a 'Number Already Exists Response' received, then it waits for the 'Directory Transmit' command from the same responding Network Telephone Phone.
21: Phone Number Broadcast. Sent by the Network Telephone Source Phone with its Number to the rest of other Network Telephone Devices in the network so they can store the number in their look-up tables (LUTs) for Number Dialing.
22: Phone Name Broadcast. Sent by the Network Telephone Phone so other Network Devices can update their LUTs for Name Dialing.
23: Reserved.
24: Reserved.
25: Phone Number Already Exists. Sent by Network Telephone Source Phone to indicate that its phone number matches the number of the Network Telephone Destination Phone.
26: Phone Directory Request. Sent by the Network Telephone Device or User to another Network Telephone Device so the user can update the Phone Directory of the his Device. A user who manually configures his phone with a new number uses this command to update the Phone Directory of his phone. Network Telephone Trunk Line Card/Digital Attendant or similar device can use this command to update its Phone Directory.
27: Broadcast Phone Directory Request. Sent by the Network Telephone Trunk Line Card/Digital Attendant to update its Directory or by the Network Telephone Phone when it first tries out its phone number but does not receive any Directory Transmit Command from other device. The Control Data byte determines the t or time count (each count=10 ms; 0–1=10 ms, 2=20 ms, 3=30 ms, . . . n=(30×n) ms. For 100 Mbit/s Ethernet system, the count=2 minimum. For 10 Mbits/s Ethernet system, the count=20 minimum) in milliseconds for the response time of the 'Phone Directory Broadcast' command. (See next command below)
28: Phone Directory Broadcast. Control Data Field should be as follows: Group/Type, MAC Address, Phone Number, Name (if any), Group/Type, MAC Address, Phone Number, Name (if any) of n devices. This Command is sent by the Network Telephone Source Device in response to a 'Phone Directory Request Broadcast' command (Command 27). This command should be executed only once from a single device to prevent the network from being flooded (since all Phone Directories are identical). In other words, only one device executes this command and the others do not repeat the command when they receive this command from the network. The following formula (n−1)×t applies, where: n is the order number of phone number (from lowest to highest or 1 to N where N=Number of Phone Sets); t, the time in milliseconds (example 30 milliseconds), determines which device should execute this command; and [(n−1)×t] is time out period before a device can issue this command. Device with the order phone number equal to 1 (n=1, number 1) will issue this command right away since its time-out period is 0 ms. If, for some reason, device number 1 is not present, then the device with n=2 and t=30 ms has a 30 ms time out before it can issue this command. Larger timeout times are computed for higher order numbers.
29: Phone Directory Transmit. This command is sent in response to the 'Phone Directory Request' command (26). Control Data Field should be as follows: Group/Type, MAC Address, Phone Number, Name (if any), Group/Type, MAC Address, Phone Number, Name (if any) of n devices.
2A: Phone Directory Received. This Status lets the other Device know that its Phone Directory has been received.
2B: Reserved.
2C: Reserved.
2D: Phone Set Inventory Request Broadcast. The Broadcast Command is to request the presence of all the Network Telephone Devices (LAN Phone Sets) in the network. This command is optional and used only to reconcile the Presence of all the Phone Devices with the LUT because some devices may be no longer in service (removed). The Control Data byte determines the t or time (t greater than 0; default minimum 30 ms) in milliseconds for the response of the Phone Directory Broadcast command. (See commands 27 & 2E below)
2E: Device Tally Broadcast. The command is in response to the Phone Set Inventory Request Broadcast above. Each Phone Set should wait for the [(n−1)*t ] time out period to expire before issue this command. The formula allows each device to execute this command in an orderly manner and every one of them will have the chance to execute this command. Control Data Field should be as follows: Group/Type, MAC Address, Phone Number, Name (if any).
2F: Device Group/Type Request. Used to request the Device Group/Type of the Network Phone.
30: Device Group/Type Status. This Status is used in response to the Device Group/Type Request Command.
31: Device Group/Type Configure Sent to Network Destination Phone to configure its Group/Type. Used by the Administrator to configure the Group/Type of the Network Destination device.

32: Device Group/Type. The Broadcast Command is for Non Network Phone Devices such as Mail Box, PSTN Line Card, or similar devices so all the Network Telephone Devices can use its MAC Address to build up their LUTs.

Following is an example of the Network Telephone Trunk Line Card broadcasting the 'Device Type' command in an LAN Phone System where users have to dial digit 9 (access code) first in order to get access to the outside call (Dial digit 9 then follows by the telephone number):

```
0132 000012 01 09
0132 ←----------------------- Device Type Command (Command Header)
     000012 ←--------------- Trunk Card (Group Type)
            01 ←---------- 1 byte follows (Byte Count)
               09 ←------- Digit 9 (for Access Code to Trunk Line Card)
```

33: Reserved.
34: Reserved.
35: Data Message Storage Request. Request to the Network Telephone Destination Device for Data Message Storage. If the control data field is non-blank, then it is for $3^{rd}$ part network phone device. The control field contains the MAC address, phone number of third party data message storage request if any.
36: Voice Message Storage Request. Request to the Network Telephone Destination Device for Voice Message Storage. If the control data field is non-blank, then it is for $3^{rd}$ part network phone device. The control field contains the MAC address, phone number of third party voice message storage request, if any.
37: Data Message Storage Acknowledge. Send to the Network Telephone Destination Device for 'Voice Message Storage' acknowledgement.
38: Reserved
39: Retrieve Data Message. The Network Telephone Source Phone is requesting the Data Message from Network Telephone Voice Mail Device/Phone.
3A: Retrieve Voice Message. The Network Telephone Source Phone is requesting the Voice Message from Network Telephone Voice Mail Device/Phone.
3B: Retrieve Next Data Message. The Network Telephone Source Phone is requesting the next Data Message from Network Telephone Voice Mail Device/Phone.
3C: Retrieve Next Voice Message. The Network Telephone Source Phone is requesting the next Voice Message from Network Telephone Voice Mail Device/Phone.
3D: Retrieve Previous Data Message. The Network Telephone Source Phone is requesting the previous Data Message from Network Telephone Voice Mail Device/Phone.
3E: Retrieve Previous Voice Message. The Network Telephone Source Phone is requesting the previous Voice Message from Network Telephone Voice Mail Device/Phone.
3F: Retrieve Data Message N. The Network Telephone Source Phone is requesting the Data Message Number (N=1 to n) from Network Telephone Voice Mail Device/Phone.
40: Retrieve Voice Message N. The Network Telephone Source Phone is requesting the Voice Message Number (N=1 to n) from Network Telephone Voice Mail Device/Phone.
41: Reserved.
42: Reserved.
43: Data Message Available. The Network Telephone Source Device (i.e. Voice Mail) informs the Network Telephone Destination Phone that a Data Message is Available in its Mail Box.
44: Voice Message Available. The Network Telephone Source Device (i.e. Voice Mail) informs the Destination Phone that a Voice Message is Available in its Mail Box.
45: Delete Current Data Message. The Network Telephone Source Device requests to the Network Telephone Destination Device (Voice Mail/Phone) that its Current Data Message is to be deleted in its Mail Box.
46: Delete Current Voice Message. The Network Telephone Source Device requests to the Network Telephone Destination Device (Voice Mail/Phone) that its Current Voice Message is to be deleted in its Mail Box.
47: Delete All Data Messages. The Network Telephone Source Device requests to the Network Telephone Destination Device (Voice Mail/Phone) that all of its Data Messages are to be deleted in the Mail Box.
48: Delete All Voice Messages. The Network Telephone Source Device requests to the Network Telephone Destination Device (Voice Mail/Phone) that all of its Voice Messages are to be deleted in the Mail Box.
49: Reserved.
4A: Reserved.
4B: Data Message Deleted. Sent out to inform the Network Telephone Received Phone that the current Data Message is already Deleted.
4C: Voice Message Deleted. Sent out to inform the Network Telephone Received Phone that the current Voice Message is already Deleted.
4D: Data Mail Box Empty. Sent out to inform the Network Telephone Received Phone that its Data Box is Empty.
4E: Voice Mail Box Empty. Sent out to inform the Network Telephone Received Phone that its Voice Box is Empty.
4F: Data Mail Box Full. Sent out to inform the Network Telephone Received Phone that its Data Mail Box is Full.
50: Voice Mail Box Full. Sent out to inform the Network Telephone Received Phone that its Voice Mail Box is Full.
51: Data Message Ready. Informs the Network Telephone Caller Phone that it is ready to accept the Data Message.
52: Reserved.
53: Password Request. Sent to Network Telephone Destination Phone for its Password.
54: Password Entry. Send to Network Telephone Destination Phone with its Password.
55: Password OK. Send to Network Telephone Destination Phone to Inform that the Password is OK
56: Password not OK. Send to Network Telephone Destination Phone to Inform that the Password is not OK
57: Reserved.
58: Reserved.
59: Remote Call Pickup. Sent by the Network Telephone Source Phone to a Ringing Network Telephone Destination Phone so the user is able to pick up the call. The Control Data field contains its phone number.
5A: Program Call Forward. Send to the Network Telephone Destination Phone so the Network Telephone Destination Phone will forward all Calls to the third party Phone. The phone number is part of the Network Phone Data Field.
5B: Paging. Send to the Network Telephone Destination Phone (without ringing it first) the Voice Data (Audio) Message.
5C: Reserved.
5D: Reserved.
5E: Reserved.

5F: Time Transmit. Send to the Network Telephone Destination Phone the Time of Day.

60: Date Transmit. Send to the Network Telephone Destination Phone the Month, Day and Year.

61: Reserved.

62: Call Log Request. Send to the Network Telephone Destination Phone for Call Log Information.

63: Call Park Retrieve. Send to the Network Telephone Destination Phone (whose call is parked) for Call Park Retrieval. Upon receiving this command, the called device will transfer the call to the Caller and goes to idle (on-hook).

64: Device Polling. Used by the Trunk Line Card/Attendant to poll each Network Phone device every few seconds so it knows if the device is still present or not and its related status. This command is optional.

65: Bridge Feature Program. Send to the Network Telephone Destination Phones for Bridge Feature Programming. The duration of the bridge feature is determined by the count in the two bytes in the Control Data field. The count decrements every minute and this feature will expire when it reaches zero. The Device programmed with this feature will allow other callers to call in for Conference Meeting, . . . Callers calling in will be asked for correct password and only then will be allowed to connect to this device. When the Bridge Feature expires, the Phone will resort back to its normal Group/Type Feature.

66: Device Activity Request. Send to the Network Telephone Destination Phone for its Activity Information. It is used for Administrating and Accounting Purposes.

67: Device Activity Report. Send to the Network Telephone Destination Device its Activity Information such as call duration, call time, destination number, . . .

68: Device Account Open. Assign the account to the Network Telephone Destination Device for Billing and Accounting purposes.

69: Device Account Close. Close the account to the Network Telephone Destination Device.

6A–DF: Reserved

E0: Retrieve Firmware Version. Retrieve from the Network Telephone Destination Device its Firmware Version Number.

E1: Retrieve Hardware Version. Retrieve from the Network Telephone Destination Device its Hardware Version Number.

E2: Reserved.

E3: Reserved.

E4: Firmware Version/Revision Number. Version/Revision Number of the Current Firmware.

E5: Hardware Version/Revision Number. Version/Revision Number of the Hardware.

E6: Reserved.

E7: Reserved.

E8: Reserved.

E9: Transmit Data Loop Back. Used to Send Loop Back Data to an Network Telephone Destination Device. The Ethernet Control Data field contains the Loop Back Data. It is used mainly for Debugging Purpose.

EA: Echo Data Loop Back. Used to Echo Loop Back Data to an Network Telephone Destination Device. The Ethernet Control Data field contains the Loop Back Data. It is used mainly for Debugging Purpose.

EB: Command Error Status. Used to inform the Network Telephone Destination Device of its Command Error Status EC: Command Does not Exist. Used to inform the Network Telephone Destination Device that its Command does not Exist.

ED: Request. Used to Send a Request to a Network Telephone Destination Device. It is used mainly for Debugging Purpose.

EE: Acknowledge. Used to Acknowledge the Request Command. It is used mainly for Debugging Purpose.

EF: Reserved

F0: Firmware Update Download Broadcast. Broadcast to all Network Telephone Devices their Updated Firmware Program.

F1: Firmware Update Download Request. Sent to the Network Telephone Destination Device for its Updated Firmware Program.

F2: Firmware Update Download Transmit. Sent to the Network Telephone Destination Device its Updated Firmware Program.

F3: Firmware Download Acknowledge. Sent to the Network Telephone Destination Device that it has received its Firmware Program.

F4: Key Map Download Request. Sent to the Network Telephone Destination Device for its Updated Key Map.

F5: Key Map Download. Sent to the Network Telephone Destination Device its Updated Key Map.

F6–FF: Reserved

Table 5 shows the Group/Type information (field 641 of FIG. 22D) for various embodiments of the present invention. The Group/Type information is composed of three bytes of information, 24 bits total in binary. The three bytes can be represented in binary form as: eeee:dddd:cccc:bbbb:aaaa: aaaa. The code segment aaaa:aaaa represents the Type code, and is shown in the third column in Table 5. The code segment bbbb represents the Priority code. The code segment cccc represents the Group code, and is shown, along with the Priority code in column 2 of Table 5. The code segment dddd represents the Paging code, and is shown in the first column of Table 5.

TABLE 5

| ___:Page | Group:Priority | Type | Code | Description |
|---|---|---|---|---|
| eeee:dddd | cccc:bbbb | aaaa:aaaa | | |
| | | 00000000 | BO | Inter-Building Only |
| | | 00000001 | LC | Local Call Allowed |
| | | 00000010 | DC | Long Distance Call Allowed |
| | | 00000011 | IC | International Call Allowed |
| | | 00000110 | MC | Microphone for listening only |
| | | 00000111 | SP | Speaker Phone for Paging only |
| | | 00001xxx | spare | Spare |
| | | 00010000 | FM | Fax Machine |
| | | 00010001 | VM | Voice Mail Device |
| | | 00010010 | TC | Trunk Line Card/ Digital Attendan |
| | | 00010011 | VC | VPN Line Card |
| | | 00010100 | | |
| | | 00010101 | USB | USB Device |
| | | 00010110 | USB | USB Video Input Device |
| | | 00010111 | USB | USB Video output Device |
| | | 00011000 | USB | USB Scanner Device |
| | | 00011001 | USB | USB Printer Device |
| ___:0000 | | | NP | No Priority |
| ___:0001 | | | P0 | Priority 0 Lowest |
| ___:001x | | | P1 | Priority 1 |

TABLE 5-continued

| :Page | Group:Priority | Type | Code | Description |
|---|---|---|---|---|
| | ___:01xx | | P2 | Priority 2 |
| | ___:1xxx | | P3 | Priority 3 Highest |
| | 0000:___ | | DL | Direct Line |
| | 0001:___ | | G1 | Group 1 |
| | 0010:___ | | G2 | Group 2 |
| | 0100:___ | | G3 | Group 3 |
| | 1000:___ | | G4 | Group 4 |
| ___:0000 | | | Pg0 | Individual Paging Only |
| ___:0001 | | | Pg1 | Group 1 Paging |
| ___:0010 | | | Pg2 | Group 2 Paging |
| ___:0100 | | | Pg3 | Group 3 Paging |
| ___:1000 | | | Pg4 | Group 4 Paging |
| 0000:___ | | | | Reserved |

Explanation of the entries in Table 5 follows:

Type:
BO: Network Phone Calls allowed taking place only within the Company Building, for example, phones located in Reception Lobby area. p0 LC: Local Call only for phones located in such area as the Lab where more than one persons would be using the phones and no long distance is allowed. p0 DC: Long Distance Call allowed such as individual phones where the user needs to make long distance calls very often. p0 IC: International Calls allowed such as people in marketing department whose phones have the need for such service. p0 MC: Microphone Type or the Phone is for listening only. Should not be implemented for Ethic and Legal Reasons. p0 SP: Speakerphone is used for Paging only in areas such as Cafeteria, Lab, Warehouse. The Caller dials its number and can start speaking as soon as it makes the connection. If there is a Paging message going on, a Busy Tone will alert the user so he/she can use it later. p0 FM: Standard Fax Machine. p0 VM: Voice Mail Device. This could be PC where Voice & Data Messages are stored and retrieved. The Retrieve & Transmit Driver is implemented by its Software Application. p0 TC: Trunk Line Card/ Digital Attendant. The Hardware Device can reside in a PC or Stand Alone one. It allows the Network Telephone Devices to communicate to the PSTN. p0 VC: VPN Line Card. The Hardware Device can reside in a PC or Stand Alone one. It allows the Network Telephone Devices to communicate to the Data Network p0 USB: Universal Serial Interface.

Priority: p0 NP: No priority. p0 Pn: Any external incoming call will be transmitted by the Attendant (with Extension Option) to the phone with the highest Priority first. Only when it is busy then it will be routed to the next phone. P0 has the lowest priority and P3 the highest. This feature applies only when there are less phone numbers assigned by the Central Office (Phone Company) than the number of phone sets.

Group: p0 DL: Direct Line indicates that an incoming call will be directed to the phone with the matched number. p0 G1, G2, G3, G4: Group Line means an incoming call will be directed to the first available phone in the group (since they use one common telephone number). Only when all the phones in the group are used then busy will tone generated. Groups can be overlapped when more than 1 bit is set. When a phone have group overlap feature it will not be rung until one of its group of phone lines are totally busy. Phones with Group Features still can support Direct Line call. Phone with Direct Line Feature will not support Group. Examples of Group Line Phones are in Sale, Customer Support, Warehouse, . . . where only one common Phone Number (group) is needed.

Page: p0 Pg1, Pg2 , Pg3 and Pg4: Paging is applied only for Speaker Phone(s). When Paging happens, every one of the Speakerphones with the same Group Paging bit turned on will be transmitted with the same Paging Command.

Figure 23:
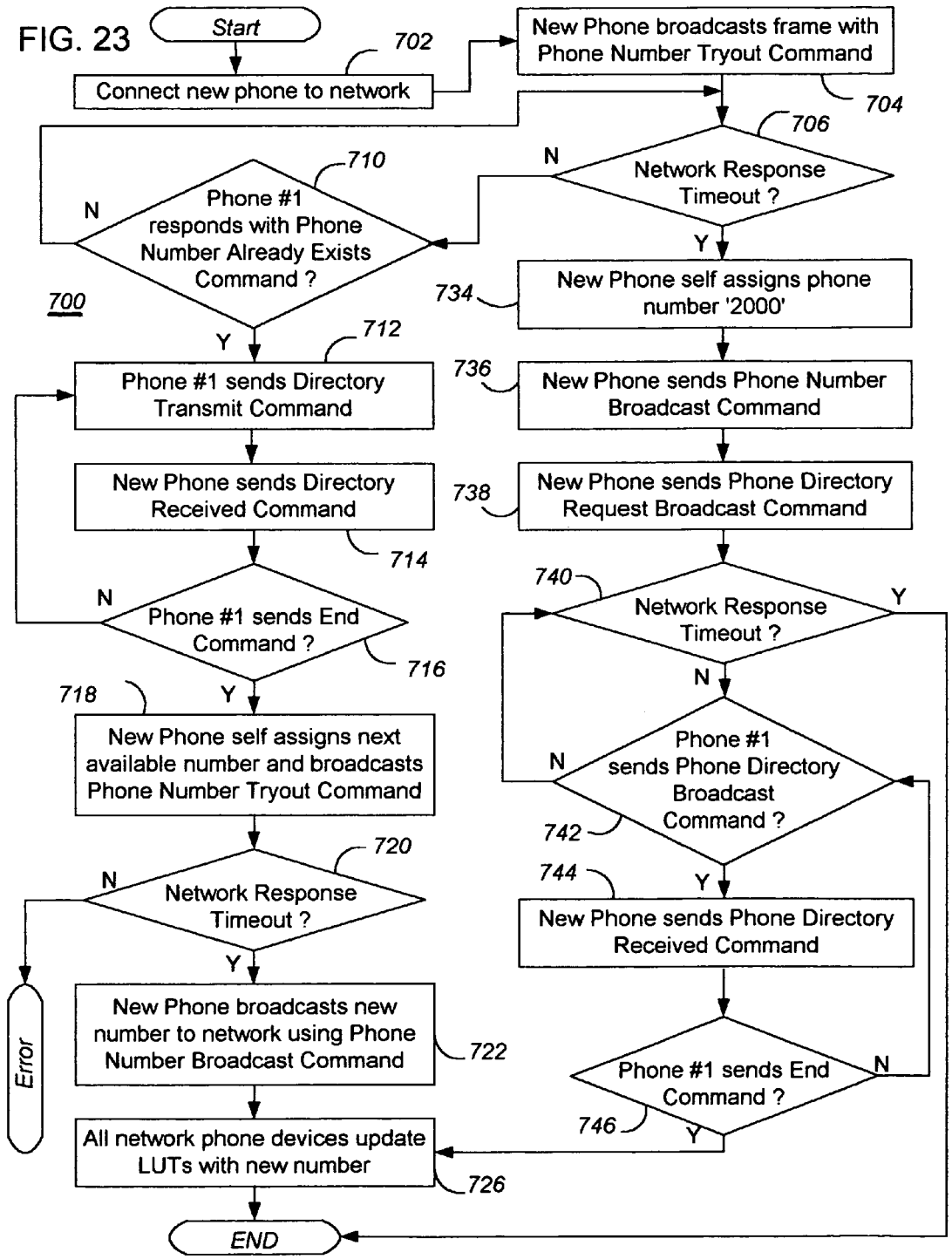
FIG. 23 shows a flow chart illustrating the process of configuring telephones added to the network in accordance with an embodiment of the present invention.

FIG. 23 shows a flow chart 700 illustrating the process of configuring a telephone that is added to the network in accordance with an embodiment of the present invention. In step 702, a new phone is connected to the network and, in step 704, the phone broadcasts over the network a 'Phone Number Tryout' command with an initial number of '2000'. In step 706, the newly connected phone waits for a response from the network. If there is a network response timeout, as determined in step 706 (meaning that there is no response during the timeout period), then, in step 734, the newly connected phone assigns the number '2000' to itself, and, in step 734, broadcasts a 'Phone Number Broadcast' command over the network, after which the newly connected phone sends a 'Phone Directory Request Broadcast' command, in step 738 and waits for a response. If a network response timeout occurs, then the newly connected phone is the only one in the network. A response received during the network response timeout, in step 740, contains the phone directory of all existing phones sent from phone #1, in step 742. The newly connected phone then acknowledges the message containing the directory by sending a 'Phone Directory Received' command, in step 744, and the process completes with the receipt of an 'End' command from phone #1, in step 746. Otherwise, phone #1 again sends a 'Directory Broadcast' command, in step 742. All network phone devices update their LUTs in step 726.

If there is a response during the timeout period, as determined in step 706, then the newly connected phone is not the only phone connected to the network. At least one other phone is connected to the network and of these, one of them is the phone that was first connected to the network. That phone, designated Phone #1, responds to the 'Phone Number Tryout' command with a 'Phone Number Already Number Exists' message, because the number broadcast in the 'Phone Number Tryout' command, i.e., 2000, is the number adopted by the phone first connected to the network. Phone #1, in step 712, next sends out a 'Directory Transmit Command', which includes a directory of numbers for all existing phones on the network, and the newly connected phone responds, in step 714, with the 'Directory Received' command. In step 716, the new phone receives the complete directory when phone #1 sends the 'End' command. Otherwise, phone #1 again sends a 'Directory Transmit Command', in step 712.

The newly connected phone now adopts the next available (unassigned) number in the directory, in step 718, and broadcasts a 'Phone Number Tryout' command again with the adopted number over the network, to determine whether there is a conflict with another phone. If there is no conflicting number, as determined in step 720, then the newly connected phone broadcasts, in step 722, a 'Phone Number Transmit' command that includes the adopted number, to the network. Following this, in step 726, each phone device on the network updates a look-up table (LUT) in that device with the new number. If the adopted number is a conflicting number, as determined in step 720, then there is a network error that needs to be investigated and the process terminates.

Figure 24:
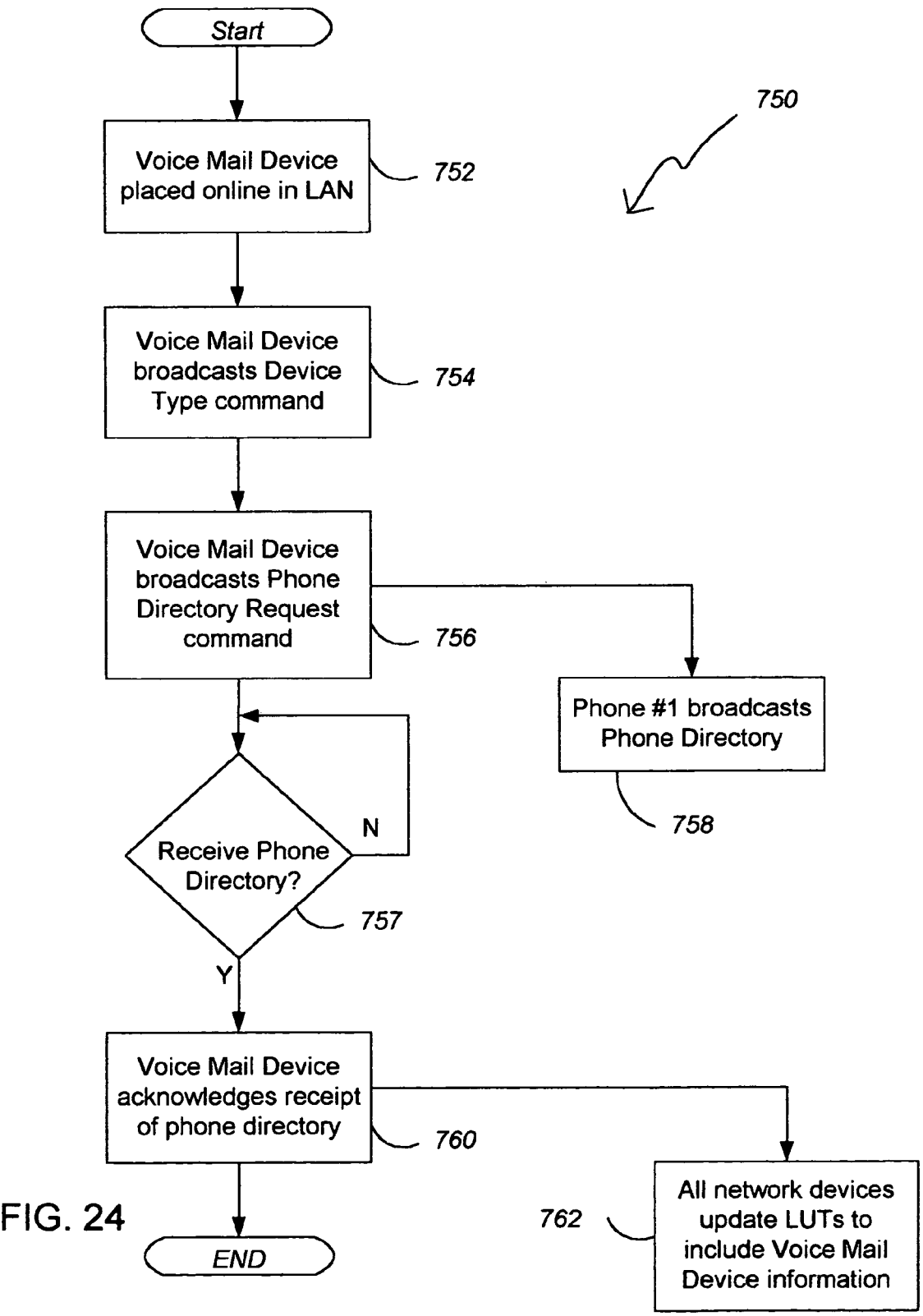
FIG. 24 shows a flow chart illustrating the process of configuring a Voice Mail Device added to the network, in accordance with an embodiment of the present invention.

FIG. 24 shows a flow chart 750 illustrating the process of configuring a Voice Mail Device added to the network, in accordance with an embodiment of the present invention. This process is similar to that described above for adding new phones. In this process, phone #1 must be previously installed and operational. Starting in step 752, a Voice Mail device is placed online in the network. In step 754, the Voice Mail Device broadcasts the 'Device Type' command and the 'Phone Directory Request' command, in step 756 and waits in step 757 for a response. In response, in step 758, phone #1 broadcasts the phone directory of numbers. The Voice Mail Device acknowledges receipt of the phone directory, in step 760, and all network devices update their LUTs to include the Voice Mail Device information, in step 762.

Figure 25:
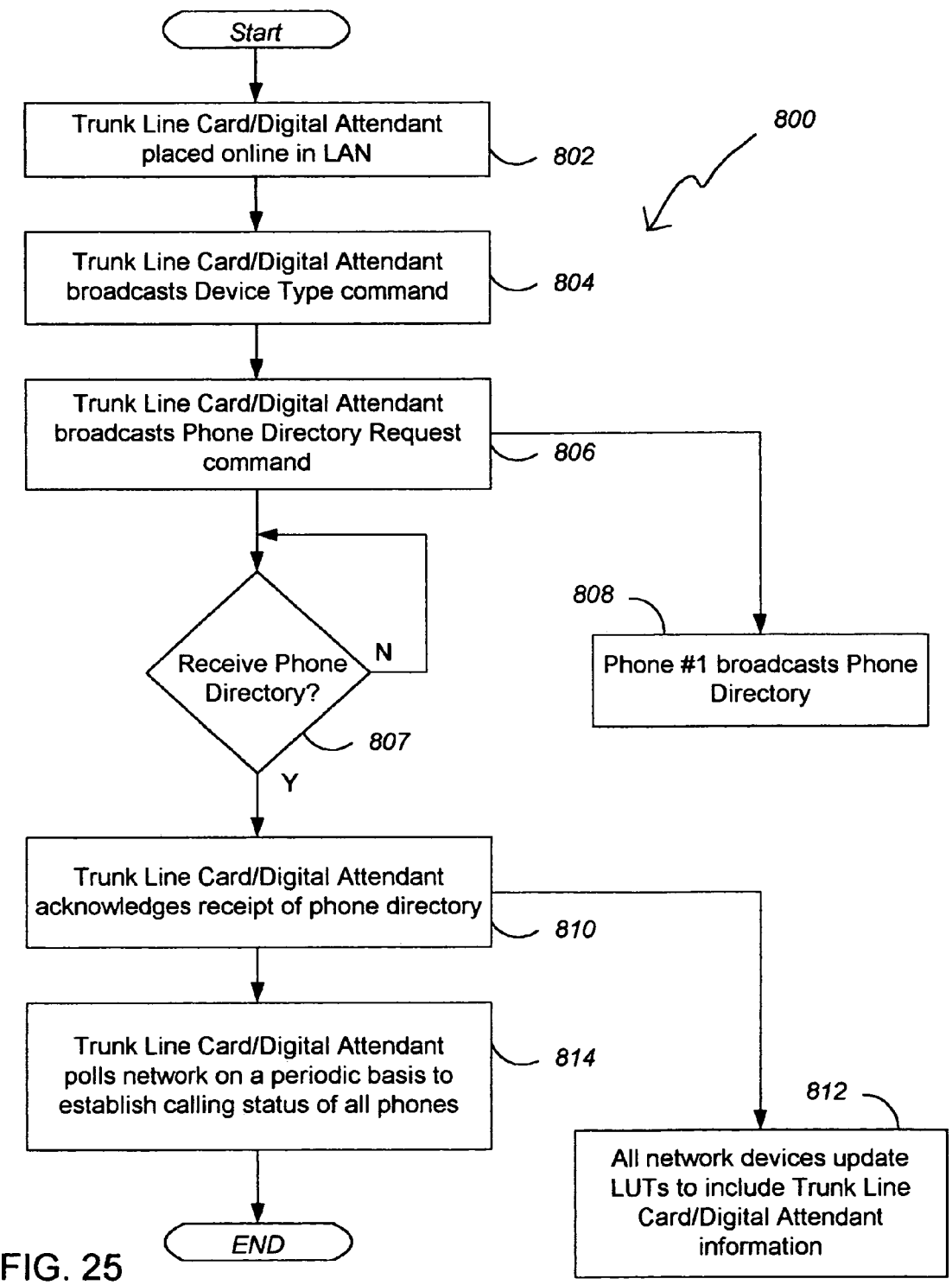
FIG. 25 shows a flow chart illustrating the process of configuring a Trunk Line Card/Digital Attendant that is added to the network, in accordance with an embodiment of the present invention.

FIG. 25 shows a flow chart 800 illustrating the process of configuring a Trunk Line Card/Digital Attendant that is added to the network, in accordance with an embodiment of the present invention. Phone #1 must be installed and operational. In step 802, the Trunk Line Card/Digital Attendant is placed online in the network and in step 804, the Attendant broadcasts a 'Device Type' command, in step 804, followed by a 'Phone Directory Request' command, in step 806. In step 808, phone #1 broadcasts the directory of phone numbers, in response to the 'Phone Directory Request' command. The Trunk Line Card/Digital Attendant acknowledges receipt of the phone directory, in step 810, and all network devices update their LUTs to include the Trunk Line Card/Digital Attendant information, in step 812. The Trunk Line Card/Digital Attendant polls the network on a periodic basis to establish the calling status of all phones, in step 814.

Figure 26:
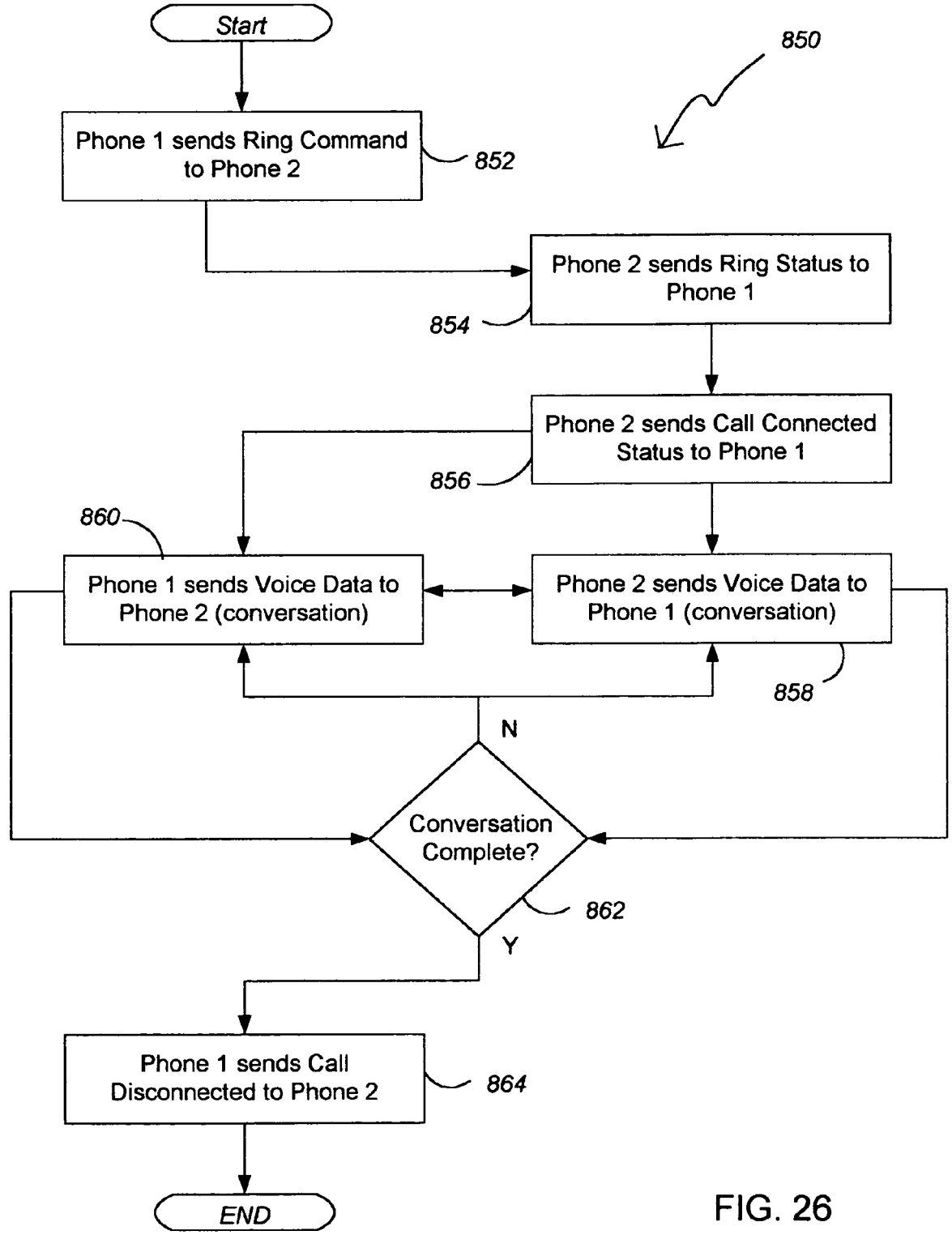
FIG. 26 shows a flow chart illustrating the process occurring during a phone call between two network phones, in accordance with an embodiment of the present invention.

FIG. 26 shows a flow chart 850 illustrating the process occurring during a phone call between two network phones, in accordance with an embodiment of the present invention. The call is initiated, in step 852, when phone 1 sends a 'Ring Command' to phone 2. In response, phone 2 sends a 'Ring Status' message to phone 1, in step 854. After the call is answered, phone 2 sends a 'Call Connected Status' message to phone 1, in step 856, following which, phones 1 and 2 exchange voice data (the conversation), in step 858 and step 860. Steps 858 and 860 repeat while the conversation continues. When the conversation is completed, as determined in step 862, phone 1 sends a 'Call Disconnect' command to phone 2, in step 864. It is also possible to have phone 2 terminate the conversation by sending a 'Call Disconnect' command to phone 1 in like fashion.

Figure 27:
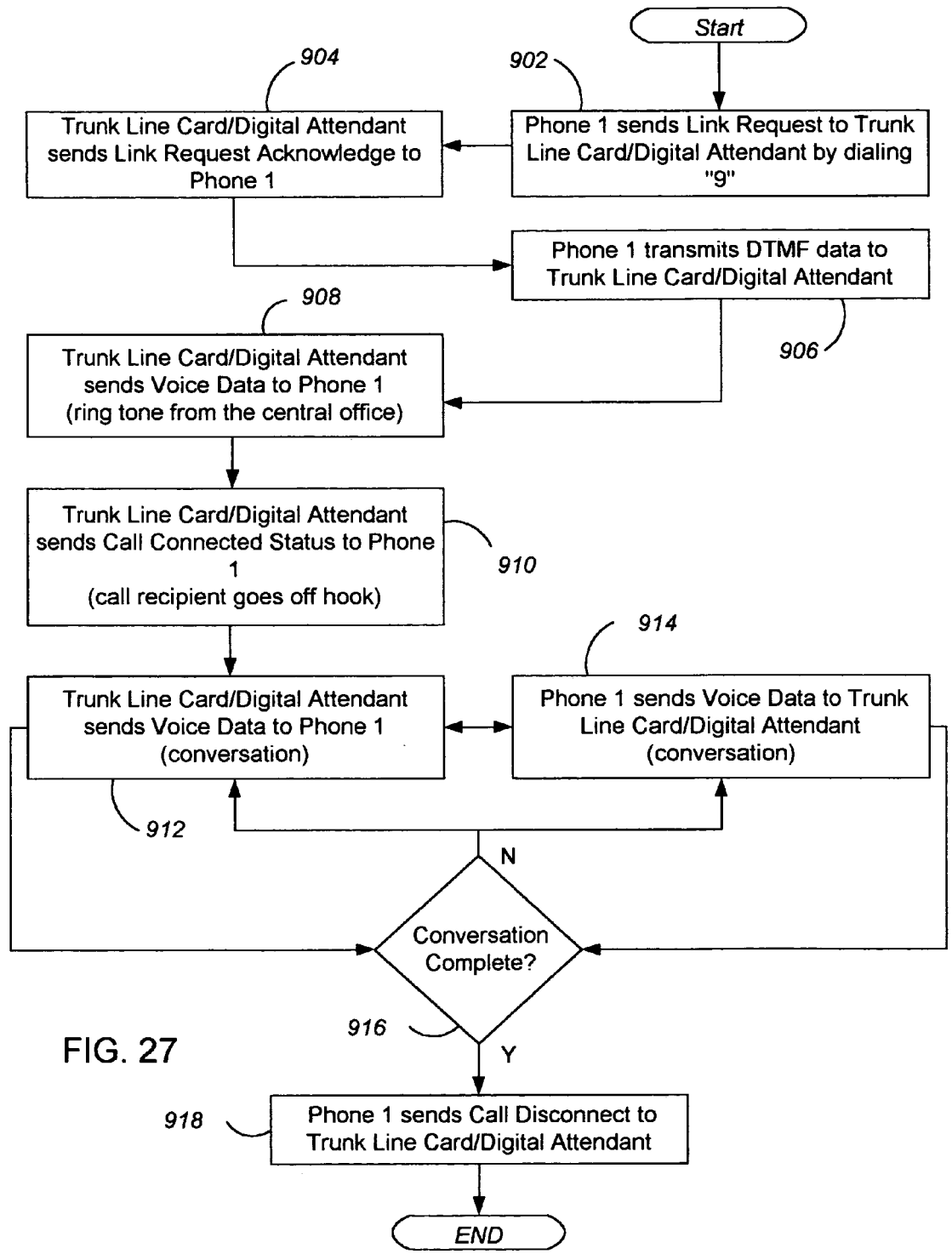
FIG. 27 shows flow chart illustrating the process of completing an outside a phone call from a network phone, in accordance with an embodiment of the present invention.

FIG. 27 shows flow chart 900 illustrating the process of completing an outside phone call from a network phone, in accordance with an embodiment of the present invention. In this process, the user (phone 1) makes an outside call from a network phone. The process begins at step 902 with phone 1 sending a 'Link Request' (code 1B in Table 4) by dialing "9" or some other character programmed to provide outside line access. The Trunk Line Card acknowledges the request by sending a 'Link Request Acknowledge' to phone 1, in step 904. Phone 1 next transmits to the Trunk Line Card/Digital Attendant, in step 906, a DTMF (Dual Tone Multi-Frequency) message, which is used by the Trunk Line card/Digital Attendant to connect to the outside phone number in the PSTN (see FIG. 1, item 208). The Trunk Line Card/Digital Attendant sends to phone 1 a ring tone that originated from the central office, in step 908. When the call is completed by the recipient going 'off-hook', the Trunk Line Card sends a 'Call Connected' status to phone 1, in step 910. The phone conversation between phone 1 and the outside caller, via the Trunk Line Card, occurs in steps 912 and 914. When the conversation is complete, as determined in step 916, phone 1 sends a 'Call Disconnect' message, in step 918, to the Trunk Line Card/Digital Assistant (the outside caller), or visa-versa, if the outside caller terminated the call.

Although the present invention has been described in considerable detail with reference to certain preferred versions thereof, other versions are possible. Therefore, the spirit and scope of the appended claims should not be limited to the description of the preferred versions contained herein.

What is claimed is:

1. A method for automatically configuring a network phone system having a first network phone and a second network phone coupled to a network, comprising:
   receiving a directory message over the network from the second network phone, the directory message including a telephone directory that includes at least one assigned extension network phone number;
   finding a non-conflicting extension network phone number from the received telephone directory;
   adopting the found non-conflicting extension network phone number for the first network phone; and
   broadcasting the adopted non-conflicting extension network phone number over the network.

2. The method for configuring as recited in claim 1, further comprising broadcasting a command containing a predetermined extension network phone number by sending out a broadcast frame with a 'Phone Number Tryout Command' prior to receiving the directory message.

3. The method for configuring as recited in claim 2 further comprising receiving a 'Number Already Exists Command' from the second network phone.

4. The method for configuring as recited in claim 1, wherein the directory message is a 'Directory Transmit Command'.

5. The method for configuring as recited in claim 1, wherein broadcasting the adopted non-conflicting extension network phone number over the network is performed by sending out a broadcast frame with a 'Phone Number Transmit Command'.

6. The method for configuring as recited in claim 1, wherein finding a non-conflicting network phone number includes:
   selecting an available extension network phone number using the telephone directory;
   broadcasting, over the network, a command containing the selected available extension network phone number; and
   if no response from the network occurs during a timeout period, adopting the selected available non-TCP/IP network phone number as the number for the first network phone.

7. The method for configuring as recited in claim 6, wherein broadcasting a command containing the selected available extension network phone number is performed by send a broadcast frame with a 'Phone Number Tryout Command'.

8. The method for configuring as recited in claim 1, further comprising, after receiving the directory message, acknowledging the receipt of the directory message.

9. The method for configuring as recited in claim 8, wherein acknowledging the receipt of the directory message is performed by sending a 'Directory Received Command'.

10. A method for configuring a network phone system having an at least one network phone coupled to network, comprising:
    selecting a predetermined extension network phone number as the number for the at least one network phone;

broadcasting the predetermined extension network phone number over the network;

requesting a phone directory be sent from any other network phone coupled to the network; and if no response is received, adopting the selected predetermined extension network phone number as the number for the at least one network phone.

11. The method for configuring as recited in claim 10, wherein broadcasting the predetermined extension network phone number over the network is performed by sending a broadcast frame with a 'Phone Number Broadcast Command'.

12. The method for automatically configuring a network phone system as recited in claim 1, further comprising receiving a number-assigned response over the network, prior to the receiving a directory message over the network.

13. The method as recited in claim 12, further comprising broadcasting a message containing a predetermined extension network phone number over the network prior to receiving a number-assigned response.

14. A first network phone useful in association with a second network phone, the first network phone and the second network phone coupled to a network, comprising:

memory circuitry configured to receive a directory message over the network from the second network phone, the directory message including a telephone directory that includes at least one assigned extension network phone number;

memory circuitry configured to find a non-conflicting extension network phone number from the received telephone directory;

memory circuitry configured to adopt the found non-conflicting extension network phone number for the first network phone; and memory circuitry configured to broadcast the adopted non-conflicting extension network phone number over the network.

15. The first network phone as recited in claim 14, further comprising memory circuitry configured to broadcast a command containing a predetermined extension network phone number by sending out a broadcast frame with a 'Phone Number Tryout Command' prior to receiving the directory message.

16. The first network phone as recited in claim 15 further comprising memory circuitry configured to receive a 'Number Already Exists Command' from the second network phone.

17. The first network phone as recited in claim 15, wherein the directory message is a 'Directory Transmit Command'.

18. The first network phone as recited in claim 14, wherein broadcasting the adopted non-conflicting extension network phone number over the network is performed by sending out a broadcast frame with a 'Phone Number Transmit Command'.

19. The first network phone as recited in claim 14, wherein memory circuitry configured to find the non-conflicting network phone number includes:

memory circuitry configured to select an available extension network phone number using the telephone directory;

memory circuitry configured to broadcast, over the network, a command containing the selected available extension network phone number; and if no response from the network occurs during a timeout period, memory circuitry configured to adopt the selected available extension phone number as the number for the first network phone.

20. The first network phone as recited in claim 19, wherein broadcasting a command containing the selected available number is performed by send a broadcast frame with a 'Phone Number Tryout Command'.

21. The first network phone as recited in claim 14, further comprising memory circuitry configured to, after receiving the directory message, acknowledge the receipt of the directory message.

22. The first network phone as recited in claim 21, wherein acknowledging the receipt of the directory message is performed by sending a 'Directory Received Command'.

23. The first network phone as recited in claim 14, further comprising memory circuitry configured to receive a number-assigned response over the network, prior to the receiving a directory message over the network.

24. The first network phone as recited in claim 23, further comprising memory circuitry configured to broadcast a message containing a predetermined non-TCP/IP network phone number over the network prior to receiving a number-assigned response.

25. A network phone coupled to a network, the network phone comprising:

memory circuitry configured to select a predetermined extension network phone number as the number for the network phone;

memory circuitry configured to broadcast the predetermined extension network phone number over the network;

memory circuitry configured to request a phone directory be sent from any other network phone coupled to the network; and if no response is received, memory circuitry configured to adopt the selected predetermined extension network phone number as the number for the network phone.

26. The network phone as recited in claim 25, wherein broadcasting the predetermined extension network phone number over the network is performed by sending a broadcast frame with a 'Phone Number Broadcast Command'.

\* \* \* \* \*